(12) United States Patent
Gotoh et al.

(10) Patent No.: US 6,730,155 B2
(45) Date of Patent: May 4, 2004

(54) AQUEOUS INK COMPOSITION

(75) Inventors: Akihiko Gotoh, Kanagawa (JP); Tomoko Maeda, Saitama (JP); Akiko Bannai, Tokyo (JP); Kiyofumi Nagai, Tokyo (JP); Hitoshi Arita, Kanagawa (JP); Tetsuya Kaneko, Kanagawa (JP); Nobutaka Osada, Shizuoka (JP); Toshiroh Tokuno, Kanagawa (JP); Masayuki Koyano, Kanagawa (JP); Kakuji Murakami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 09/894,778

(22) Filed: Jun. 29, 2001

(65) Prior Publication Data

US 2002/0096085 A1 Jul. 25, 2002

(30) Foreign Application Priority Data

Jun. 30, 2000 (JP) ........................ 2000-198237
Jul. 14, 2000 (JP) ........................ 2000-213657
Jun. 6, 2001 (JP) ........................ 2001-171286

(51) Int. Cl.$^7$ ............................................. C09D 11/02
(52) U.S. Cl. ............................. 106/31.86; 106/31.75; 106/31.89
(58) Field of Search ..................... 106/31.86, 31.75, 106/31.89

(56) References Cited

U.S. PATENT DOCUMENTS

| | | | | |
|---|---|---|---|---|
| 4,509,982 A | * | 4/1985 | Iijima ...................... | 106/31.69 |
| 5,514,208 A | | 5/1996 | Nagai et al. ............. | 106/31.43 |
| 5,619,765 A | | 4/1997 | Tokita et al. ............ | 15/3 |
| 5,622,550 A | | 4/1997 | Konishi et al. ......... | 106/31.48 |
| 5,741,354 A | * | 4/1998 | Kawasumi et al. ...... | 106/31.85 |
| 5,766,325 A | * | 6/1998 | Gundlach et al. ........ | 106/31.43 |
| 5,782,254 A | | 7/1998 | Tanikawa et al. ....... | 134/109 |
| 5,788,750 A | * | 8/1998 | Gundlach et al. ........ | 106/31.27 |
| 5,810,915 A | | 9/1998 | Nagai et al. ............. | 106/31.43 |
| 5,851,717 A | | 12/1998 | Tsubuko et al. ......... | 430/111 |
| 5,879,439 A | | 3/1999 | Nagai et al. ............. | 106/31.28 |
| 5,882,390 A | | 3/1999 | Nagai et al. ............. | 106/31.49 |
| 5,954,866 A | * | 9/1999 | Ohta et al. ............... | 106/31.89 |
| 5,968,301 A | | 10/1999 | Murakami et al. ......... | 156/230 |
| 5,972,082 A | | 10/1999 | Koyano et al. .......... | 106/31.27 |
| 5,993,524 A | | 11/1999 | Nagai et al. ............. | 106/31.27 |
| 6,020,103 A | | 2/2000 | Tsubuko et al. .......... | 430/117 |
| 6,120,589 A | | 9/2000 | Bannai et al. ........... | 106/31.27 |
| 6,231,652 B1 | | 5/2001 | Koyano et al. .......... | 106/31.29 |
| 6,261,349 B1 | | 7/2001 | Nagai et al. ............. | 106/31.27 |
| 6,395,079 B1 | * | 5/2002 | Sano ....................... | 106/31.59 |
| 6,419,733 B1 | * | 7/2002 | Sano et al. ............... | 106/31.86 |
| 6,439,713 B1 | | 8/2002 | Noguchi et al. .......... | 347/103 |
| 6,506,240 B2 | * | 1/2003 | Takemoto et al. ........ | 106/31.36 |
| 6,524,383 B2 | * | 2/2003 | Komatsu et al. .......... | 106/493 |
| 2002/0007765 A1 | * | 1/2002 | Sano et al. ............... | 106/31.49 |
| 2003/0000419 A1 | * | 1/2003 | Takemoto .................. | 106/31.6 |
| 2003/0008938 A1 | * | 1/2003 | Sano et al. ................ | 523/160 |

* cited by examiner

Primary Examiner—Helene Klemanski
Assistant Examiner—Veronica F. Faison
(74) Attorney, Agent, or Firm—Oblon, Spivak, McClelland, Maier & Neustadt, P.C.

(57) ABSTRACT

An aqueous ink composition contains at least one pigment selected from the group consisting of a condensed azo pigment, a condensed polycyclic pigment, a phthalocyanine pigment, and a nickel complex azo pigment, at least an anionic surfactant with ethylene oxide group or a nonionic surfactant with ethylene oxide group as a dispersant, a wetting agent, a penetrating agent, and water, with the ink composition having a surface tension of 20 mN/m or more and less than 35 mN/m. A yellow ink containing at least one pigment selected from the group consisting of C.I. Pigment Yellow 128, C.I. Pigment Yellow 138, C.I. Pigment Yellow 151, C.I. Pigment Yellow 97, and C.I. Pigment Yellow 150, a magenta ink containing at least one pigment of C.I. Pigment Red 122 or C.I. Pigment Violet 19, a cyan ink containing at least one pigment of C.I. Pigment Blue 15:3 or C.I. Pigment Blue 15:4, each color ink further containing a specific anionic surfactant and a water-soluble organic solvent, and a black ink containing C.I. Pigment Black 7 are used together as a set of color ink compositions for ink-jet recording.

15 Claims, No Drawings

AQUEOUS INK COMPOSITION

BACKGROUND OF THE INVENTION

1. Field of the Invention

The present invention relates to an aqueous ink composition and a set of color ink compositions suitable for ink-jet printing.

2. Discussion of Background

Ink-jet printing can perform image formation by ejecting an ink liquid from a nozzle. Ink-jet printers have been rapidly spreading in recent years to output numerous documents and images prepared using a computer. Such a wide spread of ink-jet printers is ascribed to the following advantages of the ink-jet printing: printing can be performed on a sheet of plain paper, formation of color images is very easy, and noise development and consumption of electric power can be reduced. Owing to the recent progress of the ink-jet recording technique, high quality ink images equivalent to photographic images can be obtained. At the same time, however, requirements for the ink-jet printing have been diversified, namely, durability of the printed ink images in terms of water resistance and light resistance, and ink-ejection stability in the course of high speed printing.

In the ink-jet recording, a variety of water-soluble dyes are commonly used as coloring agents for the ink composition. However, the use of water-soluble dyes produces some problems. Namely, the light resistance of printed ink images is poor because the water-soluble dyes have low light resistance. Further, the water resistance of printed images is also poor, which results from the use of the water-soluble dyes.

To improve the fastness of the printed ink images, some aqueous ink compositions are proposed, each employing a pigment of which light resistance and water resistance are superior to those of the water-soluble dyes. Although the pigment-containing ink composition can provide ink images with high fastness properties, the pigments capable of exhibiting a desirable hue and saturation are fewer in number than dyes. As a result, it becomes difficult for the pigment-containing ink composition to produce color ink images with a satisfactory hue and a wide range of color reproduction. In addition, when such color images are printed on a transparent sheet for an over head projector (OHP), the projected images are lacking in sharpness because of low transparency of the recorded images.

Further, most of the color-pigment containing ink compositions which have already been put to practical use are used with paper specially designed for ink-jet printing. The application of the color-pigment containing ink compositions is limited, for example, to the application particularly requiring high light resistance and water resistance of the printed images. No color-pigment containing ink composition can cope with the formation of high quality images on a sheet of plain paper at high speed.

The pigment-containing ink composition for use with ink-jet printing is required to ensure good dispersion stability and storage stability in order to prevent clogging of a nozzle from which the ink is to be ejected. For this purpose, the pigment is finely dispersed so that the average particle diameter of the pigment particles may reach at least 0.2 $\mu$m or less and the maximum particle diameter may be about 0.6 $\mu$m in the particle size distribution. Further, in an on-demand type ink-jet printer, an aqueous ink composition remaining in a nozzle is dried if ink ejection from the nozzle is stopped for a long time. In this case, evaporation of the water content from the ink composition will impair the dispersed condition of the pigment in the ink composition, and consequently, the pigment particles will tend to aggregate and adhere to the inner surface of the nozzle. Even after the evaporation of water content inside of the nozzle, the pigment particles are expected to show good dispersion properties when the nozzle is subsequently replenished with the ink composition. Such properties of the pigment will be hereinafter referred to as "re-dispersibility." The re-dispersibility of the pigment is a very significant factor to ensure stable ink-ejection performance. On the contrary, the factor of re-dispersibility has been less considered in the conventional pigment dispersion technique although this factor is connected with the reliability of ink-jet printing.

The prior art related to the present invention is found, for example, in Japanese Laid-Open Patent Application Nos. 6-107991 and 8-209048.

An ink composition disclosed in Japanese Laid-Open Patent Application 6-107991 comprises a pigment, water-soluble resin dispersant, and a surfactant of polyoxyalkylether phosphate. This ink composition is aimed to ensure stable ink-ejection performance in the course of continuous printing by controlling the wetting of the inner surface of the nozzle by the ink. However, the viscosity of the ink composition tends to increase as a whole because of the use of the polymeric dispersant. Such tendency will often hinder the ink-ejection performance and retard the response to high frequencies that is considered essential for high-speed printing. In addition, the presence of the resin dispersant promotes aggregation and thickening of the ink composition during long-term storage. Japanese Laid-Open Patent Application 6-107991 does not suggest the ink-ejection stability after water evaporation from the ink composition remaining in the nozzle and the re-dispersibility of the pigment.

Japanese Laid-Open Patent Application 8-209048 discloses an ink composition for ink-jet recording of a thermal jet system (bubble-jet system). The ink composition comprises a disperse dye or pigment, and a water-soluble polymer and/or a surfactant, with the surfactant having a hydrophilic-lipophilic balance (HLB) of 10 or more, such as polyoxyethylene alkyl ether or polyoxyethylene alkylphenyl ether having an anionic dissociation group of phosphoric acid or carboxylic acid at the end of an ethylene oxide moiety. In this application, the above-mentioned surfactant is used to obtain fine dispersion, ensure the storage stability, and prevent the dispersant extremely heated by heating elements from adhering to the surface of the heating elements. There is no description about the ink-ejection stability and the re-dispersibility of the pigment after evaporation of water content from the ink composition in the nozzle. The HLB of the surfactant specified in Japanese Laid-Open Patent Application 8-209048 is rather wide, so that there is a possibility of the problem occurring when the selected surfactant is used in combination with any pigment illustrated in the specification. Namely, it is supposed that the ink-ejection stability may become unsatisfactory and the pigment particles may tend to adhere to the inner surface of a nozzle if the ink is allowed to stand in the nozzle without being ejected therefrom for a long time, and the water content evaporates from the ink remaining in the nozzle. In other words, the above-mentioned re-dispersibility of the pigment is poor.

Furthermore, with respect to the physical properties of the ink composition disclosed in Japanese Laid-Open Patent Application 8-209048, the surface tension of the ink composition is specified as in the range of 35 to 55 mN/m. The above specified surface tension results in slow ink permeation, so that this conventional ink composition cannot cope with the image formation on plain paper at high speed, which is one of the objects aimed by the present invention. It is impossible to forecast the phenomena to impair the ink reliability, that is, a decrease in dispersion stability and re-dispersibility of the pigment, and poor ink-ejection stability after water evaporation, which would be caused if the surface tension is controlled to less than 35 mN/m by the addition of a penetrating agent to achieve high-speed printing on plain paper. As a matter of course, Japanese Laid-Open Patent Application 8-209048 suggests no method for solving the above-mentioned problems of reliability.

With respect to yellow pigment ink compositions, monoazo pigments such as C.I. Pigment Yellow 74 and C.I. Pigment Yellow 154 as disclosed in Japanese Laid-Open Patent Application Nos. 10-120956 and 10-292139 have been commonly used as ink compositions for ink-jet printing instead of conventional benzidine yellow pigments. This is because such monoazo yellow pigments can show good color tone and high light resistance, and do not produce any problem related to safety. However, the transparency of those monoazo yellow pigments is so insufficient that secondary colors cannot be faithfully reproduced when printed on a sheet of plain paper, and projected images become dark when printed on a transparent sheet for the OHP.

In addition, C.I. Pigment Yellow 138 is also known as having good color tone and high light resistance. For preparing an ink composition, C.I. Pigment Yellow 138 is dispersed by use of a polymeric dispersant. Japanese Laid-Open Patent Application Nos. 10-120956 and 10-292139 disclose ink compositions in which C.I. Pigment Yellow 138 is dispersed with a specific styrene—acryl based dispersing agent. Those ink compositions show excellent dispersion stability at the initial stage because the pigment can be dispersed to have extremely fine particles immediately after completion of the dispersion. However, the storage stability is not always satisfactory. Further, the pigment particles are likely to be aggregated with the evaporation of water content from the ink composition even though conventional wetting agents are contained in the ink composition.

Japanese Laid-Open Patent Application No. 10-204364 discloses a set of color ink compositions. One of the yellow pigment ink compositions disclosed in the application is an ink where C.I. Pigment Yellow 138 is dispersed with a specific block copolymer. The yellow ink composition thus prepared exhibits both the initial dispersion stability and the storage stability. However, with the evaporation of the water content, some deposit tends to adhere to the inner surface of the nozzle around at the meniscus of the ink liquid remaining in the nozzle. The re-dispersibility of the above-mentioned deposit is not so poor, but the ink-ejection performance is easily disturbed when the operating condition is low humidity or when the frequency of ink ejection from the nozzle is low even if the operating humidity is normal.

An ink composition disclosed in Japanese Laid-Open Patent Application 11-172180 aims to solve the problem of poor storage stability resulting from the presence of the pigment by encapsulating C.I. Pigment Yellow 138 with a specific resin. However, there is also the problem that the pigment-containing capsules will be easily aggregated when the water content evaporates from the ink composition.

An ink composition disclosed in Japanese Laid-Open Patent Application No. 10-287841 employs a surfactant instead of a polymeric dispersant as the dispersing agent. There is disclosed the combination of a pigment with a specific hydrophilic degree and a surfactant with a specific HLB, that is, in a range of 11 to 40. In this case, the HLB range of the surfactant specified in this application is rather wide, but it is sure that fine particles can be obtained within the above-mentioned HLB range. However, when the pigment is dispersed using the surfactant disclosed in the specification, and the conventional wetting agent and additives are added to the pigment dispersion to prepare an ink composition, sufficient dispersion stability cannot be obtained. In addition, still more improvement is needed to solve the problem of the storage stability and the aggregation of particles caused by evaporation of water content even though the initial dispersion stability is satisfactory.

Japanese Laid-Open Patent Application 10-204364 discloses a technique for improving the ink-ejection stability in the continuous printing operation. More specifically, to ensure the dispersion stability of the pigment, the pigment is finely pulverized by salt milling process and subjected to oxidation to impart the self-dispersion properties to the pigment particles. However, there occurs another problem that the oxidation has an adverse effect on the coloring performance of the pigment. When high-speed printing is carried out on plain paper using the ink composition disclosed in Japanese Laid-Open Patent Application 10-204364, the obtained ink images produce poor quality because of the occurrence of feathering and color bleeding.

As previously described, there is no yellow-pigment containing ink composition that can meet all the requirements for the ink for ink-jet printing. Namely, there is a demand for a yellow-pigment containing ink composition that is satisfactory in terms of the image quality and the image fastness, in particular, no blurring at the boundary between different colors and high transparency of ink images formed on a transparent sheet for the OHP, the ink-ejection stability at the time of printing, and the storage stability and the re-dispersibility of the pigment.

SUMMARY OF THE INVENTION

Accordingly, it is a first object of the present invention to provide an aqueous ink composition containing a color pigment which can solve the problems caused by the conventional color pigment ink compositions.

A second object of the present invention is to provide a set of color ink compositions free from the problems of the conventional set of color ink compositions, in order words, a set of color ink compositions capable of producing uniform color ink images with minimum blurring, excellent color reproducibility, high transparency, and improved water resistance and light resistance, and preventing the occurrence of problems relating to the reliability such as clogging of nozzles with ink.

The above-mentioned first object of the present invention can be achieved by an aqueous ink composition comprising a coloring agent comprising at least one pigment selected from the group consisting of a condensed azo pigment, a condensed polycyclic pigment, a phthalocyanine pigment, and a nickel complex azo pigment; a dispersant for dispersing the coloring agent, comprising at least one surfactant selected from the group consisting of an anionic surfactant having ethylene oxide group and a nonionic surfactant having ethylene oxide group; a wetting agent; a penetrating agent; and water; the ink composition having a surface tension of 20 mN/m or more and less than 35 mN/m.

For preparing the ink composition, it is preferable to employ at least one pigment selected from the group consisting of C.I. Pigment Yellow 128, C.I. Pigment Yellow 138, C.I. Pigment Yellow 151, C.I. Pigment Yellow 97, C.I. Pigment Yellow 150, C.I. Pigment Red 122, C.I. Pigment Violet 19, C.I. Pigment Blue 15:3, and C.I. Pigment Blue 15:4.

The above-mentioned second object of the present invention can be achieved by a set of color ink compositions for ink-jet recording, comprising (i) a yellow ink composition which comprises a coloring agent comprising at least one pigment selected from the group consisting of C.I. Pigment Yellow 128, C.I. Pigment Yellow 138, C.I. Pigment Yellow 151, C.I. Pigment Yellow 97, and C.I. Pigment Yellow 150, an anionic surfactant comprising ethylene oxide group, which serves as a dispersing agent for the pigment and/or a penetrating agent, and a water-soluble organic solvent; (ii) a magenta ink composition which comprises a coloring agent comprising at least one pigment selected from the group consisting of C.I. Pigment Red 122 and C.I. Pigment Violet 19, an anionic surfactant comprising ethylene oxide group, which serves as a dispersing agent for the pigment and/or a penetrating agent, and a water-soluble organic solvent; (iii) a cyan ink composition which comprises a coloring agent comprising at least one pigment selected from the group consisting of C.I. Pigment Blue 15:3 and C.I. Pigment Blue 15:4, an anionic surfactant comprising ethylene oxide group, which serves as a dispersing agent for the pigment and/or a penetrating agent, and a water-soluble organic solvent; and (iv) a black ink composition which comprises C.I. Pigment Black 7.

DESCRIPTION OF THE PREFERRED EMBODIMENTS

The aqueous ink composition of the present invention comprises (1) a coloring agent, (2) a dispersant for dispersing the coloring agent, (3) a wetting agent, (4) a penetrating agent, and (5) water, and the ink composition shows a surface tension of 20 mN/m or more and less than 35 mN/m. The above-mentioned coloring agent comprises at least one pigment selected from the group consisting of a condensed azo pigment, a condensed polycyclic pigment, a phthalocyanine pigment, and a nickel complex azo pigment. As the dispersant, an anionic surfactant having ethylene oxide group and/or a nonionic surfactant having ethylene oxide group is employed. Such an ink composition according to the present invention shows excellent transparency and light resistance, and is capable of producing ink images with satisfactory color tone and density free of blurring at the boundary between different colors on a sheet of plain paper. Further, due to excellent storage stability and re-dispersibility of the pigment in the ink composition, it is possible to effectively prevent the nozzles of an ink-jet printer from being clogged with the ink and prevent a predetermined direction into which the ink droplets are ejected from the nozzle from being deviated.

To achieve high-speed ink-jet printing, ink droplets deposited on an image receiving material, that is, a recording sheet, are required to be absorbed by the recording sheet quickly; otherwise the quality of the obtained ink image will considerably decrease because color boundaries get blurred in the course of printing and ink images are smeared after printing by the application of physical friction or the like. One of the countermeasures is to increase the absorption characteristics of the surface portion of the employed recording sheet or the penetrating properties of the ink composition through the recording sheet. A sheet of plain paper does not absorb ink so quickly unless the plain paper is subjected to treatment so as to increase the absorption characteristics. In the present invention, therefore, the surface tension of the ink composition is adjusted to 20 mN/m or more and less than 35 mN/m by the addition of the penetrating agent. Thus, the decrease of image quality as above stated can be avoided. When the surface tension of the ink exceeds 35 mN/m, the image quality will readily decrease; while when the surface tension is less than 20 mN/m, the ink-ejection stability is lowered and the strike-through phenomenon frequently occurs.

The condensed azo pigment, condensed polycyclic pigment, phthalocyanine pigment, and nickel complex azo pigment, which are used as the coloring agents in the ink composition of the present invention, exhibit remarkably high light resistance. According to the conventional technique, it has been found difficult to produce ink compositions with excellent storage stability and re-dispersibility when the condensed azo pigment, condensed polycyclic pigment, and nickel complex azo pigment are used as the coloring agents. Namely, the use of such pigments causes the problems related to the reliability, that is, clogging of a print head and deviation from the predetermined direction into which ink droplets are ejected. It is also conventionally considered that the phthalocyanine pigment cannot be used to produce an ink composition for ink-jet printing because of the lack of reliability.

Further, if some penetrating agents are added to the ink composition to realize high-speed printing operation on plain paper, the ink ejection performance also becomes lacking in reliability.

The inventors of the present invention have found that the reliability of ink ejection can be recovered by using the specific surfactants as the dispersant even though the above-mentioned pigments, which are conventionally considered to decrease the reliability, are contained in the ink composition.

The condensed azo pigment is prepared by increasing the molecular weight of conventional insoluble azo pigments, for example, by means of introduction of a polar group and condensation reaction, with the aim of improving the resistance to light, heat, solvents and the like.

Specific examples of the condensed azo pigment for use in the present invention are as follows:
C.I. Pigment Yellow 93
C.I. Pigment Yellow 94
C.I. Pigment Yellow 95
C.I. Pigment Yellow 128
C.I. Pigment Yellow 151
C.I. Pigment Red 144

In addition to the above, an azo compound represented by the following formula (A) can also be used as one of the condensed azo pigments.

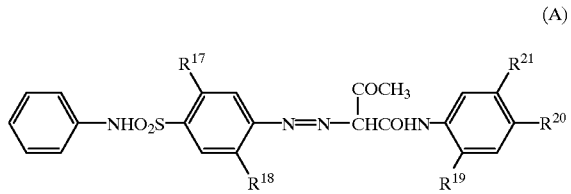

(A)

wherein $R^{17}$ to $R^{21}$ are each a hydrogen atom, an alkyl group, nitro group, amide group, acetamide group, or a halogen group.

The azo compound represented by formula (A) can produce a yellow ink image with an ideal yellow color tone and high saturation on a sheet of plain paper. The yellow ink image can exhibit sufficient transparency when printed on a transparent sheet for the OHP.

It is commonly said that monoazo pigments are inferior to polycyclic pigments in terms of the light resistance although ink images formed by using the monoazo pigments are clearer than those formed by the polycyclic pigments. However, the azo compound represented by formula (A) shows excellent light resistance in spite of its monoazo structure because the compound of formula (A) has —NHSO$_2$— group in the molecule thereof. Further, the yellow pigment of formula (A) can be finely pulverized, so that dispersion stability in the obtained ink composition is excellent, thereby preventing defective ink ejection.

Specific examples of the azo compound (A) are as follows:

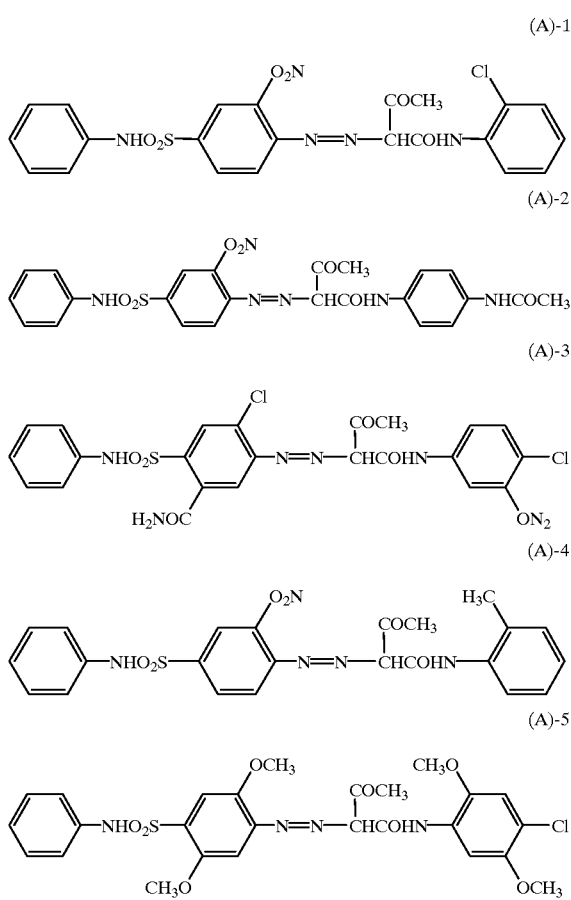

Of the above-mentioned examples, the compound of formula (A)-5 corresponds to C.I. Pigment Yellow 97, which is preferably employed in the present invention.

The condensed polycyclic pigment has such a structure that many benzene rings and heterocyclic rings are bonded to each other in a condensed form. The above-mentioned resistance of the condensed polycyclic pigment is excellent.

Specific examples of the condensed polycyclic pigment are as follows:

(Anthraquinone Pigment)
C.I. Pigment Yellow 24
C.I. Pigment Yellow 108
C.I. Pigment Yellow 123
C.I. Pigment Red 168
C.I. Pigment Red 177
C.I. Pigment Blue 60
(Quinacridone Pigment)
C.I. Pigment Violet 19
C.I. Pigment Red 122
C.I. Pigment Red 206
C.I. Pigment Red 207
C.I. Pigment Red 209
(Isoindolinone Pigment)
C.I. Pigment Yellow 109
C.I. Pigment Yellow 110
(Quinophthalone Pigment)
C.I. Pigment Yellow 138
(Isoindoline Pigment)
C.I. Pigment Yellow 139

Specific examples of the phthalocyanine pigment for use in the present invention are as follows:
C.I. Pigment Blue 15:1
C.I. Pigment Blue 15:2
C.I. Pigment Blue 15:3
C.I. Pigment Blue 15:4
C.I. Pigment Green 37
C.I. Pigment Green 7
C.I. Pigment Green 36
C.I. Pigment Blue 16
Aluminum phthalocyanine As one example of the nickel complex azo pigment, there is C.I. Pigment Yellow 150.

Of the above-mentioned pigments, the following pigments are particularly preferable: C.I. Pigment Yellow 128, C.I. Pigment Yellow 138, C.I. Pigment Yellow 151, C.I. Pigment Yellow 97, C.I. Pigment Yellow 150, C.I. Pigment Red 122, C.I. Pigment Violet 19, C.I. Pigment Blue 15:3, and C.I. Pigment Blue 15:4. Those pigments are particularly superior to others in the balance between the factors to determine the image quality, such as color tone, transparency, and light resistance and the reliability such as ink-ejection stability.

Those pigments may be used alone or in combination to control the color tone, and in addition, together with other dyes and pigments for controlling the obtained color.

It is preferable that the pigment be contained in the ink composition in an amount of 0.1 to 15 wt. %, and more preferably 1.5 to 10.0 wt. %, of the total weight of the ink composition. When the amount ratio of the pigment is 0.1 wt. % or more, sufficient saturation and image density can be obtained when ink images are formed on a sheet of plain paper. When the amount ratio of the pigment is 15 wt. % or less, a decrease in color value can be prevented and the nozzles of a print head can be prevented from being clogged.

In the pigment dispersion, it is desirable that the average particle diameter of the pigment particles be in the range of 0.01 to 0.2 μm. When the average particle diameter of the pigment particles is 0.2 μm or less, the problems concerning the reliability such as clogging of the nozzle and the storage stability of the ink composition can be effectively minimized. When the average particle diameter of the pigment particles is 0.01 μm or more, the advantages of the pigments for use in the present invention, ie., excellent light resistance and water resistance can be effectively exhibited, and aggregation of pigment particles can be prevented.

The average particle diameter herein used means a median diameter in volume base cumulative size distribution, which is obtained by dynamic light scattering.

More specifically, laser beam is applied to the particles contained in an ink composition that are in a Brownian motion, and the particle diameter is determined from a change in frequency (of light) read from the back scattering light returned from the particles.

For dispersing the pigments, a variety of dispersion apparatus, for example, a ball mill, sand mill, roll mill, colloid mill, ultrasonic homogenizer, and high-pressure homogenizer can be employed. Using any of the above-mentioned dispersion apparatus, a pigment and water serving as a solvent are mixed and dispersed, with the addition thereto of a dispersant such as an anionic surfactant or amphiphatic polymeric compound, thereby obtaining a pigment dispersion.

The dispersant for use in the ink composition of the present invention comprises an anionic surfactant having ethylene oxide group and/or a nonionic surfactant having ethylene oxide group.

When the anionic surfactant having ethylene oxide group is employed as a dispersant, the pigment can sufficiently exhibit its performance, and the pigment dispersion having such a desired particle diameter as mentioned above can be prepared at the time of dispersion. Further, even when a penetrating agent is added to control the surface tension of the obtained ink composition to 20 mN/m or more and less than 35 mN/m, the dispersion stability obtained by the anionic surfactant is seldom impaired by the mutual action between the above-mentioned anionic surfactant and the penetrating agent.

The above-mentioned surfactants serving as the dispersant are useful as the penetrating agent. However, if any of the above-mentioned anionic surfactants is added as a penetrating agent to an ink composition where a pigment is dispersed with a different kind of dispersant of which adsorptivity with respect to the pigment is less than the adsorptivity of the above-mentioned anionic surfactant, there is a risk that a stable dispersed condition may be damaged by competitive adsorption by the anionic surfactant. Therefore, the above-mentioned anionic surfactant is first used as a dispersant to prepare a pigment dispersion. If so, the anionic surfactant can also effectively work as a penetrating agent without damaging the dispersed state.

To drastically improve the dispersion stability of the pigment, it is preferable to employ as the dispersant at least one anionic surfactant having ethylene oxide group selected from the group consisting of:

a compound represented by formula (I), $$R^1O(CH_2CH_2O)_pCH_2COOM^1 \quad (I)$$

a compound represented by formula (II), $$R^2O(CH_2CH_2O)_qSO_3M^2 \quad (II) \text{ and}$$

a compound represented by formula (III), $$R^3O(CH_2CH_2O)_rPO(OM^3)OM^4 \quad (III)$$

wherein $R^1$ is a straight-chain or branched alkyl group having 6 to 14 carbon atoms; $R^2$ and $R^3$ are each an alkyl group having 4 to 24 carbon atoms, an alkylphenyl group, or an alkylallyl group; $M^1$, $M^2$, and $M^4$ are each an alkali metal ion, quaternary ammonium ion, quaternary phosphonium ion, or alkanolamine ion; $M^3$ is a hydrogen atom or $R(CH_2CH_2O)_r$ in which R is an alkyl group having 1 to 4 carbon atoms, an alkylphenyl group, or an alkylallyl group; p is an integer of 3 to 12; q is an integer of 4 to 50; and r is an integer of 4 to 20.

In the anionic surfactant, a hydrophilic group becomes an organic anionic group in water by dissociation from the molecule. In general, most of the anionic surfactants show strong dispersing action and no toxicity, so that the anionic surfactants are commonly used as a dispersant for pigments. As for the above-mentioned anionic surfactants represented by formulas (I), (II), and (III), —$COOM^1$, —$SO_3M^2$, and —$PO(OM^3)$ $OM^4$ are dissociated from the respective compounds in water and work as hydrophilic groups. Further, the presence of an oxyethylene chain adjacent to the above-mentioned hydrophilic group can promote the attraction of molecules of water. This phenomenon is considered to improve the dispersion stability and the re-dispersibility of the pigment in the ink composition. Such improvement of the dispersion stability and re-dispersibility of the pigment can prevent the pigment particles from being aggregated during a long-term storage. In addition, even though the water content evaporates from the ink composition remaining in a nozzle to some extent while the nozzle is waiting for the next ink ejection, the ink-ejection stability can be ensured. Furthermore, the above-mentioned anionic surfactants of formulas (I), (II) and (III) have the characteristics that there is no cloud point as indicated by nonionic surfactants having an oxyethylene chain. Owing to such characteristics of the anionic surfactants, the action of the oxyethylene chain to attract the molecules of water is not lowered regardless of the change in temperature or under the long-term storage condition. Those factors are considered to contribute to maintaining of high dispersion stability.

In the anionic surfactants of formulas (I), (II) and (III), the oxyethylene chain length and the alkyl chain length have an effect on both the dispersion properties and the re-dispersibility of the pigment in the ink composition. When the oxyethylene chain length and the alkyl chain length exceed the specified range, the dispersion properties or re-dispersibility of the pigment is decreased. In particular, the oxyethylene chain is indispensable to keep the dispersion properties, and the repetition number of the oxyethylene chain is important for determining the re-dispersibility of the pigment. For example, when the oxyethylene chain length exceeds the specified upper limit, the re-dispersibility of the pigment is lowered when the penetrating agent is added.

Specific examples of the compound represented by formula (I) are shown in the form of the corresponding free acids thereof.

Compound No. (I)-1: $C_{13}H_{27}O(CH_2CH_2O)_3COOH$
Compound No. (I)-2: $C_{10}H_{21}O(CH_2CH_2O)_{12}COOH$
Compound No. (I)-3: $C_4H_9C_6H_5O(CH_2CH_2O)_{10}COOH$
Compound No. (I)-4: $C_3H_7C_6H_5O(CH_2CH_2O)_{12}COOH$
Compound No. (I)-5: $C_{13}H_{27}O(CH_2CH_2O)_6COOH$ Specific examples of the compound represented by formula (II) are shown in the form of the corresponding free acids thereof.

Compound No. (II)-1: $C_8H_{17}O(CH_2CH_2O)_4SO_3H$
Compound No. (II)-2: $C_9H_{19}C_6H_5O(CH_2CH_2O)_{12}SO_3H$
Compound No. (II)-3: $C_2H_5(C_2H_5)C_{12}H_{25}C_6H_5O(C_2CH_2O)_{24}SO_3H$
Compound No. (II)-4: $CH_3(CH_2)_7CH=CH(CH_2)_8O(CH_2CH_2O)_8SO_3H$
Compound No. (II)-5: $C_{12}H_{25}C_6H_5O(CH_2CH_2O)_8SO_3H$ Specific examples of the compound represented by formula (III) are shown in the form of the corresponding free acids thereof:

Compound No. (III)-1: $CH_3(CH_2)_7CH=CH(CH_2)_8O(CH_2CH_2O)_8PO(OH)_2$

Compound No. (III)-2: $C_9H_{19}C_6H_5O(CH_2CH_2O)_3PO(CH_2CH_2O)_3OH$

Compound No. (III)-3: $C_{13}H_{27}O(CH_2CH_2O)_4PO(OH)_2$

The above-mentioned compounds may be used alone or in combination.

In addition to the above-mentioned anionic surfactant, the nonionic surfactant having ethylene oxide group may be used as the dispersant in the ink composition of the present invention. The nonionic surfactant having ethylene oxide group can be used alone. However, it is preferable to employ the nonionic surfactant together with the previously mentioned anionic surfactant because the nonionic surfactant has a cloud point as mentioned above. By using the nonionic surfactant in combination with the anionic surfactant, the cloud point of the nonionic surfactant can be made vague or can disappear. The result is that the oxyethylene chain can constantly work to attract the molecules of water even though there is some change in temperature or the ink composition is allowed to stand for a long period of time.

The nonionic surfactant has a hydrophilic group in its molecule, which is a nonionic group that is not ionized in water. As the hydrophilic group of the nonionic surfactant, a compound including polyoxyethylene group, and sorbitan, sucrose ester, monoglyceride or the like, each containing lots of hydroxyl groups, are known. In particular, the compound including oxyethylene group is preferable. This is because the HLB of the obtained surfactant can be freely controlled by changing the ratio of the oxyethylene group in the molecule, and therefore, it is possible to provide a surfactant capable of exhibiting high dispersing effect.

Specific examples of the nonionic surfactant serving as the dispersant in the present invention are polyoxyethylene alkyl ether, polyoxyethylene alkylallyl ether, polyoxyethylene alkylphenyl ether, polyoxyethylene glycol ester, polyoxyethylene polyoxypropylene glycol, polyoxyethylene ether of glycerin ester, polyoxyethylene ether of sorbitan ester, polyoxyethylene ether of sorbitol ester, polyoxyethylene fatty amide, and polyoxyethylene alkylamine.

In the aforementioned anionic surfactants of formulas (I), (II), and (III), when $M^1$, $M^2$, and $M^4$ represent an alkali metal cation such as $Na^+$ or $Li^+$, a quaternary ammonium cation of the following formula (IV), a quaternary phosphonium cation of the following formula (V), or an alkanolamine cation of the following formula (VI), excellent dispersion properties and ink-ejection stability can be obtained because of the hydration effect of those cations.

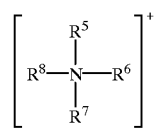
(IV)

wherein $R^5$ to $R^8$ are each a hydrogen atom, an alkyl group having 1 to 4 carbon atoms, or a halogenated alkyl group having 1 to 4 carbon atoms.

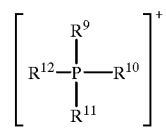
(V)

wherein $R^9$ to $R^{12}$ are each a hydrogen atom, an alkyl group having 1 to 4 carbon atoms, a hydroxyalkyl group having 1 to 4 carbon atoms, or a halogenated alkyl group having 1 to 4 carbon atoms.

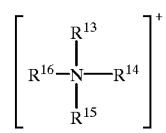
(VI)

wherein at least one of $R^{13}$ to $R^{16}$ is a hydroxyalkyl group having 1 to 4 carbon atoms, and the other is a hydrogen atom, an alkyl group having 1 to 4 carbon atoms, or a halogenated alkyl group having 1 to 4 carbon atoms.

For instance, the anionic surfactant with $Li^+$ can be prepared by the addition of lithium hydroxide. Similarly, when the anionic surfactants of formulas (I), (II), and (III) include the quaternary ammonium cation, quaternary phosphonium cation, and alkanolamine cation, hydroxides (IV-1) to (IV-6), hydroxides (V-1) and (V-2), and triethanolamine cation (VI-1) are respectively added to free acids corresponding to the anionic surfactants.

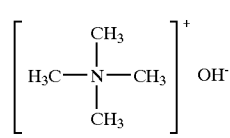
(IV-1)

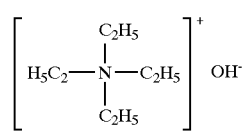
(IV-2)

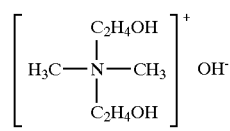
(IV-3)

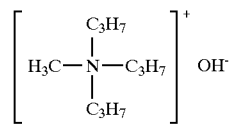
(IV-4)

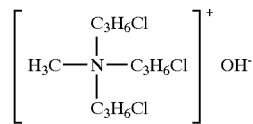
(IV-5)

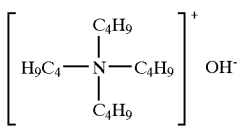
(IV-6)

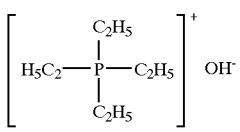
(V-1)

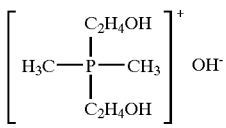
(V-2)

(VI-1)

It is not always necessary that all of the cations be selected from the group consisting of the above-mentioned cations, that is, sodium cation, lithium cation, quaternary ammonium cation of formula (IV), quaternary phosphonium cation of formula (V), and alkanolamine cation of formula (VI). Other alkali cations may be used in combination. In this case, it is preferable that sodium cation, lithium cation, quaternary ammonium cation, quaternary phosphonium cation, and alkanolamine cation be contained in a molar ratio of 30% or more, and more preferably 50% or more, of the entire number of moles. By this adjustment, the pH value of the obtained ink composition may be controlled to 9 or more and less than 11 in light of the storage stability of the obtained ink composition and the re-dispersibility of the pigment therein.

As the penetrating agent for use in the present invention, the conventionally known anionic surfactant, nonionic surfactant, and water-soluble organic solvent can be used. By use of such a penetrating agent, blurring can be reduced at the boundary between different colors and character images become sharp.

In the present invention, it is preferable to employ as the penetrating agent at least one surfactant selected from the group consisting of:

the above-mentioned anionic surfactants represented by formulas (I), (II), and (III), a nonionic surfactant represented by formula (VII),

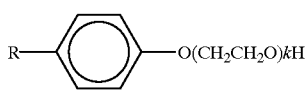
(VII)

wherein R is a straight-chain or branched carbon chain having 6 to 14 carbon atoms; and k is an integer of 5 to 12; and a nonionic surfactant represented by formula (VIII),

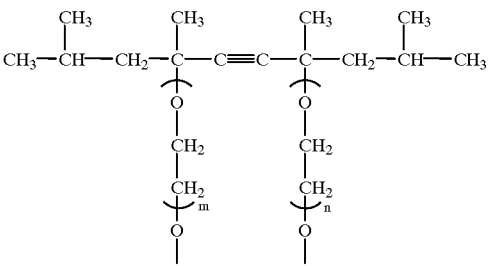
(VIII)

wherein m and n are each an integer of 0 to 40.

When the above-mentioned surfactants of formulas (I), (II), (III), (VII) and (VIII) are used as the penetrating agents, those surfactants less adversely affect the dispersion stability of the pigment particles as compared with other penetrating agents. Further, by use of those surfactants as the penetrating agents, blurring can be minimized at the boundary between different colors, and blurring of character images can be reduced.

It is preferable that the amount of the surfactants represented by formulas (I), (II), (III), (VII) and (VIII) serving as the penetrating agents be in the range of 0.05 to 10 wt. % of the entire weight of the ink composition. In such a case, desired penetrating properties can be imparted to the ink composition depending upon the system of the employed printer. To be more specific, when the amount of the surfactants with formulas (I), (II), (III), (VII) and (VIII) is less than 0.05 wt. %, the boundaries of a two-color-superimposed portion become blurred unless any other penetrating agent is added. When the amount of the surfactants with formulas (I), (II), (III), (VII) and (VIII) exceeds 10 wt. %, each surfactant tends to separate out at low temperatures, so that the reliability is lowered. In the case where any other penetrating agent is employed in addition to the above-mentioned surfactants of formulas (I), (II), (III), (VII) and (VIII), the amount of the surfactants of formulas (I), (II), (III), (VII) and (VIII) may be appropriately adjusted within the above-mentioned amount ratio range.

The penetrating agent for use in the ink composition of the present invention may further comprise a particular aqueous organic solvent in order to allow the ink to permeate through the recording sheet more smoothly. Usually, an amphiphatic compound including both a hydrophilic moiety and a hydrophobic moiety in its molecule is employed to attain the above-mentioned purpose. In the present invention, it is preferable that the penetrating agent for use in the ink composition further comprise at least one compound selected from the group consisting of a diol having 6 or more carbon atoms and a polyoxyethylene polyoxypropylene glycol represented by formula (IX):

(IX)

wherein t is an integer that can satisfy such a condition that polyoxypropylene units have a molecular weight of 2500 or less in total; and s and u are each an integer that can satisfy such a condition that the total molecular weight of polyoxyethylene units is 5 to 30% of the entire molecular weight of the polyoxyethylene polyoxypropylene glycol represented by formula (IX).

As the above-mentioned diol having 6 or more carbon atoms, 2-ethyl-1,3-hexanediol and 2,2,4-trimethyl-1,3- pentanediol are preferably employed because those diols can exhibit sufficient penetrating properties without producing any problem of aggregation of pigment particles which would be caused by mutual action with the dispersant for use in the present invention.

With respect to the polyoxyethylene polyoxypropylene glycol represented by formula (IX), it is preferable that the polypropylene glycol group have a weight average molecular weight of 1200 or less, and the molecular weight of the ethylene oxide group be in the ratio of 5 to 20% of the entire molecule weight of the polyoxyethylene polyoxypropylene glycol.

Specific examples of the polyoxyethylene polyoxypropylene glycol represented by formula (IX) are as follows:

Compound No. (IX)-1 $HO(C_2H_4O)—(C_3H_6O)_{16}—(C_2H_4O)_2H$

Compound No. (IX)-2 $HO(C_2H_4O)_3—(C_3H_6O)_{20}—(C_2H_4O)H$

Compound No. (IX)-3 $HO(C_2H_4O)—(CH_3H_6O)_{10}—(C_2H_4O)H$

Compound No. (IX)-4 $HO(C_2H_4O)—(C_3H_6O)_{17}—(C_2H_4O)H$

Compound No. (IX)-5 $HO(C_2H_4O)—(C_3H_6O)_{18}—(C_2H_4O)_3H$

It is proper that the amount of the polyoxyethylene polyoxypropylene glycol be in the range of 0.01 to 5 wt. % of the total weight of the ink composition. Further, it is preferable that 2-ethyl-1,3-hexanediol or 2,2,4-trimethyl-1,3-pentanediol be added in an amount of 0.5 to 10 wt. % of the total weight of the ink composition.

When the amount of the polyoxyethylene polyoxypropylene glycol is 0.01 wt. % or more, the penetrating properties of the ink composition can be obviously improved. When the amount of the polyoxyethylene polyoxypropylene glycol is 5 wt. % or less, the polyoxyethylene polyoxypropylene glycol compound can be stably dissolved in the ink composition, so that there is no problem in the storage stability of the ink composition and the ink-ejection stability at the time of ink-jet printing. Likewise, when 2-ethyl-1,3-hexanediol or 2,2,4-trimethyl-1,3-pentanediol is added within the above-mentioned amount ratio, the penetrating properties of the ink composition can be obviously improved, and the diol compound can be stably dissolved in the ink composition, so that there is no problem in the storage stability of the ink composition and the ink ejection stability at the time of ink-jet printing.

The polyoxyethylene polyoxypropylene glycol, 2-ethyl-1,3-hexanediol, and 2,2,4-trimethyl-1,3-pentanediol may be used alone. However, when those compounds are used in combination or together with other penetrating agents for use in the present invention, those compounds can provide high penetrating properties by synergistic effect even when the content is decreased as compared with the case where polyoxyethylene polyoxypropylene glycol, 2-ethyl-1,3-hexanediol, or 2,2,4-trimethyl-1,3-pentanediol is used alone. When compared with conventional ink compositions which contain a large amount of ethers of polyhydric alcohols or the like to increase the penetrating properties, the ink composition of the present invention has the advantages that the viscosity can be prevented from increasing and the generation of smell inherent in solvents can be minimized.

The ink composition of the present invention may further comprise urea or urea derivatives such as hydroxyethyl urea and dihydroxyethyl urea. By the addition of urea or urea derivatives, the mutual action between the pigment and the surfactant working as the penetrating agent can be weakened to reduce the association of pigment particles, thereby increasing the penetrating properties, and also improving the ink-ejection stability and long-term storage durability. It is preferable that urea or derivatives thereof be contained in an amount of 0.1 to 10 wt. % of the total weight of the ink composition. When the amount ratio is adjusted in such a manner, the above-mentioned effect of urea or urea derivatives can be obtained. At the same time, urea or urea derivatives have no adverse effect on the change in viscosity of the ink composition with the evaporation of the water content.

The ink composition of the present invention comprises a wetting agent to prevent a nozzle of an ink-jet printer from being clogged with ink. Polyhydric alcohols are preferably used as the wetting agents.

Specific examples of the wetting agent for use in the present invention include polyhydric alcohols such as ethylene glycol, diethylene glycol, triethylene glycol, polyethylene glycol, polypropylene glycol, and glycerol; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; and amines such as monoethanolamine, diethanolamine, triethanolamine, monoethylamine, diethylamine, and triethylamine; sulfur-containing compounds such as dimethyl sulfoxide, sulfolane (tetrahydrothiophene), and thiodiethanol; and propylene carbonate and ethylene carbonate. Those wetting agents may be used alone or in combination.

The above-mentioned polyhydric alcohols have not only the effect of preventing the water content of the ink composition from evaporating in the nozzle of a printer, but also the effect of improving the dispersion stability of the pigment particles for use in the present invention more effectively than other wetting agents can do. It is preferable that the amount of the polyhydric alcohols be in the range of 1 to 40 wt. %, and more preferably in the range of 5 to 20 wt. %, of the entire weight of the ink composition.

In the ink composition of the present invention, it is preferable that the wetting agent further comprise at least one pyrrolidone compound. With respect to the pyrrolidone compound for use in the present invention, N-methyl-2-pyrrolidone, N-hydroxyethylpyrrolidone, and 2-pyrrolidone can be given as examples. When the pyrrolidone derivative is added to the ink composition, it is possible to increase the image density of printed ink images without causing the strike-through phenomenon. The reason for such advantages is considered as follows:

By the addition of the pyrrolidone derivative, a surface portion of a recording sheet can get wetted easily by the ink composition in the horizontal direction, ie., in a direction parallel to the surface of the sheet. Therefore, penetration of the ink composition into the vertical direction of the recording sheet is relatively restrained. As a result, the coloring agent can be retained in the surface portion of the recording sheet. Further, due to the addition of the pyrrolidone derivative, the dispersion stability of the pigment in the ink composition can be made better.

It is preferable that the amount of the pyrrolidone derivative be in the range of 0.05 to 8 wt. %, and more preferably in the range of 0.5 to 4 wt. %, of the total weight of the ink composition.

A set of color ink compositions according to the present invention for ink-jet recording is ejected from nozzles of a printer. Thus, the ink droplets are deposited onto a recording sheet to achieve image formation. The set of color ink compositions comprises:

(i) a yellow ink composition which comprises a coloring agent comprising at least one pigment selected from the group consisting of C.I. Pigment Yellow 128, C.I. Pigment Yellow 138, C.I. Pigment Yellow 151, C.I. Pigment Yellow 97, and C.I. Pigment Yellow 150, an anionic surfactant comprising ethylene oxide group serving as a dispersant and/or a penetrating agent, and a water-soluble organic solvent;

(ii) a magenta ink composition which comprises a coloring agent comprising at least one pigment selected from the group consisting of C.I. Pigment Red 122 and C.I. Pigment Violet 19, an anionic surfactant comprising ethylene oxide group serving as a dispersant and/or a penetrating agent, and a water-soluble organic solvent;

(iii) a cyan ink composition which comprises a coloring agent comprising at least one pigment selected from the group consisting of C.I. Pigment Blue 15:3 and C.I. Pigment Blue 15:4, an anionic surfactant comprising ethylene oxide group serving as a dispersant and/or a penetrating agent, and a water-soluble organic solvent; and (iv) a black ink composition comprising C.I. Pigment Black 7.

In the above-mentioned yellow ink composition, C.I. Pigment Yellow 128, C.I. Pigment Yellow 138, C.I. Pigment Yellow 151, C.I. Pigment Yellow 97, or C.I. Pigment Yellow 150 is particularly superior to other pigments in light resistance. Therefore, when such a yellow pigment is used in combination with the cyan and magenta pigments, the light resistance of a yellow color and that of a magenta or cyan color are well-balanced throughout the printed color images.

C.I. Pigment Black 7 for use in the black ink composition is known as carbon black. The carbon black may be dispersed using any of the commonly employed surfactant to prepare a black ink composition in a finely dispersed condition. More preferably, however, the above-mentioned black ink may be used in combination with a penetrating ink containing a self-dispersible carbon black, which is prepared by bonding an acidic functional group to the surface of carbon black. In this case, the boundary between a black ink image portion thus printed and a yellow ink image portion printed using the yellow ink composition of the present invention can be more effectively prevented from getting blurred.

C.I. Pigment Red 122 for use in the magenta ink composition is a quinacridone compound with extremely high light resistance. When such a magenta ink image is printed on a sheet of plain paper, the printed ink image is provided with a clear hue of magenta color and high transparency. To prepare the magenta ink composition, C.I. Pigment Violet 19 may be used together for controlling the color tone.

C.I. Pigment Blue 15:3 and C.I. Pigment Blue 15:4 for use in the cyan ink composition are greenish β-type copper phthalocyanine compounds. Those pigments have excellent light resistance, and can be easily prepared into fine particles with good dispersion stability, so that ink ejection performance is satisfactory. In view of such advantages, those pigments are widely used in the field of printing.

When a set of color ink compositions according to the present invention is used, not only an ink image of a primary color, but also an ink image of a secondary color prepared by mixing colors can exhibit a sufficient brightness, ideal hue, and high transparency. Further, all the colors have well-balanced light resistance, so that it is possible to prevent a secondary color image from being extremely tinged with one of the colors constituting the secondary color after the secondary color image fades to a certain extent. In addition, when the yellow, magenta, and cyan inks are mixed, a composite black color having almost the same hue as that of a genuine black color can be obtained regardless of the color density.

To control the physical properties of the ink compositions according to the present invention, the following surfactants may be added: anionic surfactants such as sodium dodecylbenzenesulfonate, sodium laurate, and ammonium salt of polyoxyethylene alkyl ether sulfate; cationic surfactants such as quaternary ammonium salt; amphoteric surfactants such as imidazoline derivatives; nonionic surfactants such as polyoxyethylene alkyl ether, polyoxyethylene alkylphenyl ether, polyoxyethylene alkyl ester, polyoxyethylene alkyl amine, polyoxyethylene alkyl amide, polyoxyethylene propylene block polymer, sorbitan fatty acid ester, polyoxyethylene sorbitan fatty acid ester, and ethylene oxide adduct of acetylene alcohol; and fluorochemical surfactants. Those surfactants may be used alone or in combination.

It is preferable that the amount of the above-mentioned surfactant be in the range of 0.01 to 5.0 wt. %, and more preferably 0.5 to 3 wt. %, of the total weight of the ink composition. When the surfactant is added within the above-mentioned amount ratio, the effect of the surfactant can be obtained and an excessive increase in penetrating properties of the ink composition into the recording sheet can be prevented, so that a decrease in image density and the problem of strike-through can be minimized.

To control the surface tension of the ink composition, a variety of penetrating agents can be used.

Specific examples of such penetrating agents include anionic surfactants such as dialkylsulfosuccinic acid having a branched alkyl chain with 5 to 7 carbon atoms; nonionic surfactants such as acetylene glycol, polyoxyethylene nonylphenyl ether, and polyoxyethylene alkyl ether; fluorochemical surfactants; silicone surfactants; and lower alcohols such as ethanol and 2-propanol. Those penetrating agents may be used alone or in combination.

It is preferable that the amount of the above-mentioned penetrating agent be in the range of 0.5 to 5 wt. %, and more preferably 0.5 to 2 wt. %, of the total weight of the ink composition.

The ink composition of the present invention may further comprise conventionally known additives, such as an antiseptic agent, a mildewproofing agent, a pH adjustor, a chelate reagent, a corrosion inhibitor, and other additives in accordance with the application, for example, an ultraviolet-absorbing agent, an infrared-absorbing agent, a water-soluble polymeric compound, a dye, and a dye solubilizer.

Other features of this invention will become apparent in the course of the following description of exemplary embodiments, which are given for illustration of the invention and are not intended to be limiting thereof.

EXAMPLE 1

[Preparation of Yellow Ink No. I-1]

A mixture of the following components was first roughly dispersed in a homogenizer and then finely dispersed in a commercially available fine grinding mill "Nanomizer" (trademark), whereby a yellow pigment dispersion No. I-1 was prepared.

| | wt. % |
|---|---|
| C.I. Pigment Yellow 138 | 20.0 |
| Diethanolamine salt of $C_{13}H_{27}O(CH_2CH_2O)_{27}PO(OH)_2$ | 5.0 |
| Glycerin | 10.0 |
| Deionized water | Balance |

Thereafter, the following components were mixed and stirred, and the pH of the mixture was adjusted to 8.5 by adding thereto diethanolamine. The resultant mixture was filtered through a 0.8-μm Teflon filter, so that a yellow ink No. I-1 according to the present invention was obtained.

| | wt. % |
|---|---|
| Yellow pigment dispersion No. I-1 | 20.0 |
| Diethylene glycol | 15.0 |
| Sodium benzoate | 0.5 |
| Deionized water | Balance |

The average particle size of the yellow pigment in the yellow ink No. I-1 was measured. The results are shown in TABLE 1.

[Preparation of Magenta Ink No. I-1]

A mixture of the following components was first roughly dispersed in a homogenizer and then finely dispersed in a commercially available fine grinding mill "Nanomizer" (trademark), whereby a magenta pigment dispersion No. I-1 was prepared.

| | wt. % |
|---|---|
| C.I. Pigment Red 122 | 20.0 |
| Compound No. (III)-3 | 5.0 |
| Deionized water | Balance |

Thereafter, the following components were mixed and stirred, and the pH of the mixture was adjusted to 9.0 by adding thereto lithium hydroxide. The resultant mixture was filtered through a 0.8-μm Teflon filter, so that a magenta ink No. I-1 according to the present invention was obtained.

| | wt. % |
|---|---|
| Magenta pigment dispersion No. I-1 | 20.0 |
| 2-ethyl-1,3-hexanediol | 2.0 |
| Polypropylene glycol | 5.0 |
| Diethylene glycol | 5.0 |
| Deionized water | Balance |

[Preparation of Cyan Ink No. I-1]

A mixture of the following components was first roughly dispersed in a homogenizer and then finely dispersed in a commercially available fine grinding mill "Nanomizer" (trademark), whereby a cyan pigment dispersion No. I-1 was prepared.

| | wt. % |
|---|---|
| C.I. Pigment Blue 15:3 | 20.0 |
| Sodium salt of compound No. (II)-5 | 5.0 |
| Deionized water | Balance |

Thereafter, the following components were mixed and stirred, and the pH of the mixture was found to be 8.6. The resultant mixture was filtered through a 0.8-μm Teflon filter, so that a cyan ink No. I-1 according to the present invention was obtained.

| | wt. % |
|---|---|
| Cyan pigment dispersion No. I-1 | 10.0 |
| 2-ethyl-1,3-hexanediol | 2.0 |
| Polypropylene glycol | 5.0 |
| Diethylene glycol | 5.0 |
| Deionized water | Balance |

[Preparation of Black Ink No. I-1]

The following components were mixed and stirred. The resultant mixture was filtered through a 0.8-μm Teflon filter, so that a black ink No. I-1 according to the present invention was obtained.

| | wt. % |
|---|---|
| Dispersion of carboxyl-group-bonded carbon black (available from Cabot Corp.) (solid content: 16.4 wt. % average particle diameter: 128 nm) | 33.3 |
| Ethylene glycol | 15.0 |
| Sodium salt of compound No. (I)-1 | 1.0 |
| 2,2,4-timethyl-1,3-pentanediol | 2.0 |
| N-methyl-2-pyrrolidone | 2.0 |
| Deionized water | Balance |

EXAMPLE 2

[Preparation of Yellow Ink No. I-2]

A mixture of the following components was first roughly dispersed in a homogenizer and then finely dispersed in a commercially available fine grinding mill "Nanomizer" (trademark), whereby a yellow pigment dispersion No. I-2 was prepared.

| | wt. % |
|---|---|
| C.I. Pigment Yellow 138 | 20.0 |
| Sodium salt of compound No. (I)-1 | 5.0 |
| Glycerin | 10.0 |
| Deionized water | Balance |

The following components were mixed and stirred in the commercially available fine grinding mill "Nanomizer" (trademark). The pH of the mixture was found to be 8.5. The resultant mixture was filtered through a 0.8-μm Teflon filter, so that a yellow ink No. I-2 according to the present invention was obtained.

|  | wt. % |
| --- | --- |
| Yellow pigment dispersion No. I-2 | 20.0 |
| Diethylene glycol | 15.0 |
| Sodium pentachlorophenolate | 2.0 |
| Deionized water | Balance |

The average particle size of the yellow pigment in the yellow ink No. I-2 was measured. The results are shown in TABLE 1.

EXAMPLE 3
[Preparation of Yellow Ink No. I-3]

A mixture of the following components was first roughly dispersed in a homogenizer and then finely dispersed in a commercially available fine grinding mill "Nanomizer" (trademark), whereby a yellow pigment dispersion No. I-3 was prepared.

|  | wt. % |
| --- | --- |
| C.I. Pigment Yellow 138 | 20.0 |
| Sodium salt of compound No. (I)-2 | 5.0 |
| Glycerin | 10.0 |
| Deionized water | Balance |

The following components were mixed and stirred in the commercially available fine grinding mill "Nanomizer" (trademark). The pH of the mixture was found to be 8.3. The resultant mixture was filtered through a 0.8-$\mu$m Teflon filter, so that a yellow ink No. I-3 according to the present invention was obtained.

|  | wt. % |
| --- | --- |
| Yellow pigment dispersion No. I-3 | 20.0 |
| Glycerin | 3.0 |
| 1,5-pentanediol | 15.0 |
| Sodium dehydroacetate | 0.3 |
| Deionized water | Balance |

The average particle size of the yellow pigment in the yellow ink No. I-3 was measured. The results are shown in TABLE 1.

EXAMPLE 4
[Preparation of Yellow Ink No. I-4]

A mixture of the following components was first roughly dispersed in a homogenizer and then finely dispersed in a commercially available fine grinding mill "Nanomizer" (trademark), whereby a yellow pigment dispersion No. I-4 was prepared.

|  | wt. % |
| --- | --- |
| C.I. Pigment Yellow 138 | 20.0 |
| Potassium salt of compound No. (II)-1 | 4.0 |
| Glycerin | 10.0 |
| Deionized water | Balance |

The following components were mixed and stirred in the commercially available fine grinding mill "Nanomizer" (trademark). The pH of the mixture was found to be 8.4. The resultant mixture was filtered through a 0.8-$\mu$m Teflon filter, so that a yellow ink No. I-4 according to the present invention was obtained.

|  | wt. % |
| --- | --- |
| Yellow pigment dispersion No. I-4 | 20.0 |
| Polyethylene glycol (average molecular weight: 200) | 10.0 |
| Sodium benzoate | 1.0 |
| Deionized water | Balance |

The average particle size of the yellow pigment in the yellow ink No. I-4 was measured. The results are shown in TABLE 1.

EXAMPLE 5
[Preparation of Yellow Ink No. I-5]

A mixture of the following components was first roughly dispersed in a homogenizer and then finely dispersed in a commercially available fine grinding mill "Nanomizer" (trademark), whereby a yellow pigment dispersion No. I-5 was prepared.

|  | wt. % |
| --- | --- |
| C.I. Pigment Yellow 138 | 20.0 |
| Compound No. (III)-1 | 2.0 |
| Glycerin | 10.0 |
| Deionized water | Balance |

The following components were mixed and stirred in the commercially available fine grinding mill "Nanomizer" (trademark). The pH of the mixture was adjusted to 8.5 by adding thereto diethanolamine. The resultant mixture was filtered through a 0.8-$\mu$m Teflon filter, so that a yellow ink No. I-5 according to the present invention was obtained.

|  | wt. % |
| --- | --- |
| Yellow pigment dispersion No. I-5 | 20.0 |
| Glycerin | 3.0 |
| Diethylene glycol | 10.0 |
| Sodium pentachlorophenolate | 2.0 |
| Deionized water | Balance |

The average particle size of the yellow pigment in the yellow ink No. I-5 was measured. The results are shown in TABLE 1.

EXAMPLE 6
[Preparation of Yellow Ink No. I-6]

A mixture of the following components was first roughly dispersed in a homogenizer and then finely dispersed in a commercially available fine grinding mill "Nanomizer" (trademark), whereby a yellow pigment dispersion No. I-6 was prepared.

|  | wt. % |
| --- | --- |
| C.I. Pigment Yellow 138 | 20.0 |
| Diethanolamine salt of $C_{13}H_{27}O(CH_2CH_2O)_{27}PO(OH)_2$ | 3.0 |

-continued

| | wt. % |
|---|---|
| Glycerin | 10.0 |
| Polyoxyethylene nonylphenyl ether | 2.0 |
| Deionized water | Balance |

The following components were mixed and stirred in the commercially available fine grinding mill "Nanomizer" (trademark). The pH of the mixture was adjusted to 8.5 by adding thereto diethanolamine. The resultant mixture was filtered through a 0.8-$\mu$m Teflon filter, so that a yellow ink No. I-6 according to the present invention was obtained.

| | wt. % |
|---|---|
| Yellow pigment dispersion No. I-6 | 20.0 |
| Glycerin | 3.0 |
| 1,5-pentanediol | 10.0 |
| Sodium dehydroacetate | 1.0 |
| Deionized water | Balance |

The average particle size of the yellow pigment in the yellow ink No. I-6 was measured. The results are shown in TABLE 1.

EXAMPLE 7

[Preparation of Yellow Ink No. I-7]

A mixture of the following components was first roughly dispersed in a homogenizer and then finely dispersed in a commercially available fine grinding mill "Nanomizer" (trademark), whereby a yellow pigment dispersion No. I-7 was prepared.

| | wt. % |
|---|---|
| C.I. Pigment Yellow 138 | 20.0 |
| Compound No. (II)-2 | 5.0 |
| Deionized water | Balance |

The following components were mixed and stirred in the commercially available fine grinding mill "Nanomizer" (trademark). The pH of the mixture was found to be 8.6. The resultant mixture was filtered through a 0.8-$\mu$m Teflon filter, so that a yellow ink No. I-7 according to the present invention was obtained.

| | wt. % |
|---|---|
| Yellow pigment dispersion No. I-7 | 20.0 |
| Glycerin | 5.0 |
| Polyethylene glycol (average molecular weight: 200) | 10.0 |
| Penetrating agent represented by formula (VII) wherein R = $C_9H_{19}$ and k = 8 | 1.0 |
| Deionized water | Balance |

The average particle size of the yellow pigment in the yellow ink No. I-7 was measured. The results are shown in TABLE 1.

EXAMPLE 8

[Preparation of Yellow Ink No. I-8]

A mixture of the following components was first roughly dispersed in a homogenizer and then finely dispersed in a commercially available fine grinding mill "Nanomizer" (trademark), whereby a yellow pigment dispersion No. I-8 was prepared.

| | wt. % |
|---|---|
| C.I. Pigment Yellow 138 | 20.0 |
| Diethylene glycol | 10.0 |
| Potassium salt of compound No. (II)-3 | 5.0 |
| Deionized water | Balance |

The following components were mixed and stirred in the commercially available fine grinding mill "Nanomizer" (trademark). The pH of the mixture was found to be 8.4. The resultant mixture was filtered through a 0.8-$\mu$m Teflon filter, so that a yellow ink No. I-8 according to the present invention was obtained.

| | wt. % |
|---|---|
| Yellow pigment dispersion No. I-8 | 20.0 |
| Glycerin | 5.0 |
| Penetrating agent represented by formula (VIII) wherein p + q = 40 | 1.0 |
| Deionized water | Balance |

The average particle size of the yellow pigment in the yellow ink No. I-8 was measured. The results are shown in TABLE 1.

EXAMPLE 9

[Preparation of Yellow Ink No. I-9]

A mixture of the following components was first roughly dispersed in a homogenizer and then finely dispersed in a commercially available fine grinding mill "Nanomizer" (trademark), whereby a yellow pigment dispersion No. I-9 was prepared.

| | wt. % |
|---|---|
| C.I. Pigment Yellow 138 | 20.0 |
| Glycerin | 10.0 |
| Compound No. (II)-4 | 5.0 |
| Deionized water | Balance |

The following components were mixed and stirred in the commercially available fine grinding mill "Nanomizer" (trademark). The pH of the mixture was found to be 8.6. The resultant mixture was filtered through a 0.8-$\mu$m Teflon filter, so that a yellow ink No. I-9 according to the present invention was obtained.

| | wt. % |
|---|---|
| Yellow pigment dispersion No. I-9 | 20.0 |
| 1,5-pentanediol | 10.0 |

-continued

|  | wt. % |
|---|---|
| Compound No. (I)-2 | 0.5 |
| Deionized water | Balance |

The average particle size of the yellow pigment in the yellow ink No. I-9 was measured. The results are shown in TABLE 1.

EXAMPLE 10

[Preparation of Yellow Ink No. I-10]

A mixture of the following components was first roughly dispersed in a homogenizer and then finely dispersed in a commercially available fine grinding mill "Nanomizer" (trademark), whereby a yellow pigment dispersion No. I-10 was prepared.

|  | wt. % |
|---|---|
| C.I. Pigment Yellow 138 | 20.0 |
| Glycerin | 10.0 |
| Compound No. (II)-4 | 5.0 |
| Deionized water | Balance |

The following components were mixed and stirred in the commercially available fine grinding mill "Nanomizer" (trademark). The pH of the mixture was found to be 8.5. The resultant mixture was filtered through a 0.8-$\mu$m Teflon filter, so that a yellow ink No. I-10 according to the present invention was obtained.

|  | wt. % |
|---|---|
| Yellow pigment dispersion No. I-10 | 20.0 |
| 1,5-pentanediol | 10.0 |
| Compound No. (I)-1 | 0.5 |
| 2-ethyl-1,3-hexanediol | 2.0 |
| Deionized water | Balance |

The average particle size of the yellow pigment in the yellow ink No. I-10 was measured. The results are shown in TABLE 1.

EXAMPLE 11

[Preparation of Yellow Ink No. I-11]

A mixture of the following components was first roughly dispersed in a homogenizer and then finely dispersed in a commercially available fine grinding mill "Nanomizer" (trademark), whereby a yellow pigment dispersion No. I-11 was prepared.

|  | wt. % |
|---|---|
| C.I. Pigment Yellow 138 | 20.0 |
| Compound No. (III)-2 | 5.0 |
| Deionized water | Balance |

The following components were mixed and stirred in the commercially available fine grinding mill "Nanomizer" (trademark). The pH of the mixture was found to be 8.4. The resultant mixture was filtered through a 0.8-$\mu$m Teflon filter, so that a yellow ink No. I-11 according to the present invention was obtained.

|  | wt. % |
|---|---|
| Yellow pigment dispersion No. I-11 | 20.0 |
| Glycerin | 5.0 |
| 1,5-pentanediol | 10.0 |
| Penetrating agent represented by formula (IX)-2 | 0.3 |
| 2,2,4-trimethyl-1,3-pentanediol | 2.0 |
| Deionized water | Balance |

The average particle size of the yellow pigment in the yellow ink No. I-11 was measured. The results are shown in TABLE 1.

EXAMPLE 12

[Preparation of Yellow Ink No. I-12]

A mixture of the following components was first roughly dispersed in a homogenizer and then finely dispersed in a commercially available fine grinding mill "Nanomizer" (trademark), whereby a yellow pigment dispersion No. I-12 was prepared.

|  | wt. % |
|---|---|
| C.I. Pigment Yellow 138 | 20.0 |
| Glycerin | 10.0 |
| Sodium salt of compound No. (II)-5 | 5.0 |
| Deionized water | Balance |

The following components were mixed and stirred in the commercially available fine grinding mill "Nanomizer" (trademark). The pH of the mixture was found to be 8.7. The resultant mixture was filtered through a 0.8-$\mu$m Teflon filter, so that a yellow ink No. I-12 according to the present invention was obtained.

|  | wt. % |
|---|---|
| Yellow pigment dispersion No. I-12 | 20.0 |
| Glycerin | 3.0 |
| Diethylene glycol | 10.0 |
| Hydroxyethyl urea | 5.0 |
| Penetrating agent represented by formula (VII) wherein R = $C_9H_{19}$ and k = 8 | 1.0 |
| Deionized water | Balance |

The average particle size of the yellow pigment in the yellow ink No. I-12 was measured. The results are shown in TABLE 1.

EXAMPLE 13

[Preparation of Yellow Ink No. I-13]

A mixture of the following components was first roughly dispersed in a homogenizer and then finely dispersed in a commercially available fine grinding mill "Nanomizer" (trademark), whereby a yellow pigment dispersion No. I-13 was prepared.

| | wt. % |
|---|---|
| C.I. Pigment Yellow 138 | 20.0 |
| Glycerin | 10.0 |
| Compound No. (III)-3 | 5.0 |
| Deionized water | Balance |

The following components were mixed and stirred in the commercially available fine grinding mill "Nanomizer" (trademark). The pH of the mixture was found to be 8.6. The resultant mixture was filtered through a 0.8-μm Teflon filter, so that a yellow ink No. I-13 according to the present invention was obtained.

| | wt. % |
|---|---|
| Yellow pigment dispersion No. I-13 | 20.0 |
| Glycerin | 3.0 |
| Diethylene glycol | 10.0 |
| N-hydroxyethylpyrrolidone | 5.0 |
| Compound No. (I)-5 | 0.5 |
| 2,2,4-trimethyl-1,3-pentanediol | 2.0 |
| Deionized water | Balance |

The average particle size of the yellow pigment in the yellow ink No. I-13 was measured. The results are shown in TABLE 1.

EXAMPLE 14
[Preparation of Yellow Ink No. I-14]

A mixture of the following components was first roughly dispersed in a homogenizer and then finely dispersed in a commercially available fine grinding mill "Nanomizer" (trademark), whereby a yellow pigment dispersion No. I-14 was prepared.

| | wt. % |
|---|---|
| C.I. Pigment Yellow 138 | 20.0 |
| Glycerin | 10.0 |
| Compound No. (II)-2 | 5.0 |
| Deionized water | Balance |

The following components were mixed and stirred in the commercially available fine grinding mill "Nanomizer" (trademark). The pH of the mixture was adjusted to 10.5 by adding thereto lithium hydroxide. The resultant mixture was filtered through a 0.8-μm Teflon filter, so that a yellow ink No. I-14 according to the present invention was obtained.

| | wt. % |
|---|---|
| Yellow pigment dispersion No. I-14 | 20.0 |
| Polyethylene glycol (average molecular weight: 200) | 10.0 |
| 2-pyrrolidone | 5.0 |
| Compound No. (I)-5 | 0.5 |
| Deionized water | Balance |

The average particle size of the yellow pigment in the yellow ink No. I-14 was measured. The results are shown in TABLE 1.

EXAMPLE 15
[Preparation of Yellow Ink No. I-15]

A mixture of the following components was first roughly dispersed in a homogenizer and then finely dispersed in a commercially available fine grinding mill "Nanomizer" (trademark), whereby a yellow pigment dispersion No. I-15 was prepared.

| | wt. % |
|---|---|
| C.I. Pigment Yellow 138 | 20.0 |
| Sodium salt of compound No. (I)-2 | 5.0 |
| Deionized water | Balance |

The following components were mixed and stirred in the commercially available fine grinding mill "Nanomizer" (trademark). The pH of the mixture was adjusted to 10.5 by adding thereto sodium hydroxide. The resultant mixture was filtered through a 0.8-μm Teflon filter, so that a yellow ink No. I-15 according to the present invention was obtained.

| | wt. % |
|---|---|
| Yellow pigment dispersion No. I-15 | 20.0 |
| Glycerin | 5.0 |
| 1,5-pentanediol | 10.0 |
| Urea | 5.0 |
| Penetrating agent represented by formula (VII) wherein R = $C_9H_{19}$ and k = 8 | 1.0 |
| Deionized water | Balance |

The average particle size of the yellow pigment in the yellow ink No. I-15 was measured. The results are shown in TABLE 1.

EXAMPLE 16
[Preparation of Yellow Ink No. I-16]

A mixture of the following components was first roughly dispersed in a homogenizer and then finely dispersed in a commercially available fine grinding mill "Nanomizer" (trademark), whereby a yellow pigment dispersion No. I-16 was prepared.

| | wt. % |
|---|---|
| C.I. Pigment Yellow 138 | 20.0 |
| Glycerin | 10.0 |
| Compound No. (III)-2 | 5.0 |
| Deionized water | Balance |

The following components were mixed and stirred in the commercially available fine grinding mill "Nanomizer" (trademark). The pH of the mixture was adjusted to 10.0 by adding thereto the compound No. (V)-1. The resultant mixture was filtered through a 0.8-μm Teflon filter, so that a yellow ink No. I-16 according to the present invention was obtained.

|  | wt. % |
| --- | --- |
| Yellow pigment dispersion No. I-16 | 20.0 |
| Glycerin | 3.0 |
| Diethylene glycol | 10.0 |
| 2-pyrrolidone | 5.0 |
| Compound No. (I)-3 | 0.5 |
| 2-ethyl-1,3-hexanediol | 2.0 |
| Deionized water | Balance |

The average particle size of the yellow pigment in the yellow ink No. I-16 was measured. The results are shown in TABLE 1.

EXAMPLE 17

[Preparation of Yellow Ink No. I-17]

A mixture of the following components was first roughly dispersed in a homogenizer and then finely dispersed in a commercially available fine grinding mill "Nanomizer" (trademark), whereby a yellow pigment dispersion No. I-17 was prepared.

|  | wt. % |
| --- | --- |
| C.I. Pigment Yellow 138 | 20.0 |
| Sodium salt of compound No. (II)-3 | 5.0 |
| Deionized water | Balance |

The following components were mixed and stirred in the commercially available fine grinding mill "Nanomizer" (trademark). The pH of the mixture was adjusted to 10.5 by adding thereto lithium hydroxide. The resultant mixture was filtered through a 0.8-μm Teflon filter, so that a yellow ink No. I-17 according to the present invention was obtained.

|  | wt. % |
| --- | --- |
| Yellow pigment dispersion No. I-17 | 20.0 |
| Polyethylene glycol (average molecular weight: 200) | 15.0 |
| Penetrating agent represented by formula (IX)-4 | 0.5 |
| 2,2,4-trimethyl-1,3-pentanediol | 2.0 |
| Deionized water | Balance |

The average particle size of the yellow pigment in the yellow ink No. I-17 was measured. The results are shown in TABLE 1.

EXAMPLE 18

[Preparation of Yellow Ink No. I-18]

A mixture of the following components was first roughly dispersed in a homogenizer and then finely dispersed in a commercially available fine grinding mill "Nanomizer" (trademark), whereby a yellow pigment dispersion No. I-18 was prepared.

|  | wt. % |
| --- | --- |
| C.I. Pigment Yellow 128 | 20.0 |
| Glycerin | 10.0 |
| Sodium salt of compound No. (I)-1 | 5.0 |
| Deionized water | Balance |

The following components were mixed and stirred in the commercially available fine grinding mill "Nanomizer" (trademark). The pH of the mixture was found to be 8.5. The resultant mixture was filtered through a 0.8-μm Teflon filter, so that a yellow ink No. I-18 according to the present invention was obtained.

|  | wt. % |
| --- | --- |
| Yellow pigment dispersion No. I-18 | 20.0 |
| Diethylene glycol | 15.0 |
| Sodium pentachlorophenolate | 2.0 |
| Deionized water | Balance |

The average particle size of the yellow pigment in the yellow ink No. I-18 was measured. The results are shown in TABLE 1.

EXAMPLE 19

[Preparation of Yellow Ink No. I-19]

A mixture of the following components was first roughly dispersed in a homogenizer and then finely dispersed in a commercially available fine grinding mill "Nanomizer" (trademark), whereby a yellow pigment dispersion No. I-19 was prepared.

|  | wt. % |
| --- | --- |
| C.I. Pigment Yellow 151 | 20.0 |
| Compound No. (II)-2 | 5.0 |
| Deionized water | Balance |

The following components were mixed and stirred in the commercially available fine grinding mill "Nanomizer" (trademark). The pH of the mixture was found to be 8.6. The resultant mixture was filtered through a 0.8-μm Teflon filter, so that a yellow ink No. I-19 according to the present invention was obtained.

|  | wt. % |
| --- | --- |
| Yellow pigment dispersion No. I-19 | 20.0 |
| Glycerin | 5.0 |
| Polyethylene glycol (average molecular weight: 200) | 10.0 |
| Penetrating agent represented by formula (VII) wherein R = $C_9H_{19}$ and k = 8 | 1.0 |
| Deionized water | Balance |

The average particle size of the yellow pigment in the yellow ink No. I-19 was measured. The results are shown in TABLE 1.

EXAMPLE 20
[Preparation of Magenta Ink No. I-2]

A mixture of the following components was first roughly dispersed in a homogenizer and then finely dispersed in a commercially available fine grinding mill "Nanomizer" (trademark), whereby a magenta pigment dispersion No. I-2 was prepared.

| | wt. % |
|---|---|
| C.I. Pigment Red 122 | 20.0 |
| Glycerin | 10.0 |
| Compound No. (II)-4 | 5.0 |
| Deionized water | Balance |

The following components were mixed and stirred in the commercially available fine grinding mill "Nanomizer" (trademark). The pH of the mixture was found to be 8.6. The resultant mixture was filtered through a 0.8-μm Teflon filter, so that a magenta ink No. I-2 according to the present invention was obtained.

| | wt. % |
|---|---|
| Magenta pigment dispersion No. I-2 | 20.0 |
| 1,5-pentanediol | 10.0 |
| Compound No. (I)-2 | 0.5 |
| Deionized water | Balance |

The average particle size of the magenta pigment in the magenta ink No. I-2 was measured. The results are shown in TABLE 1.

EXAMPLE 21
[Preparation of Magenta Ink No. I-3]

A mixture of the following components was first roughly dispersed in a homogenizer and then finely dispersed in a commercially available fine grinding mill "Nanomizer" (trademark), whereby a magenta pigment dispersion No. I-3 was prepared.

| | wt. % |
|---|---|
| C.I. Pigment Red 122 | 20.0 |
| Glycerin | 10.0 |
| Compound No. (II)-4 | 5.0 |
| Deionized water | Balance |

The following components were mixed and stirred in the commercially available fine grinding mill "Nanomizer" (trademark). The pH of the mixture was found to be 8.4. The resultant mixture was filtered through a 0.8-μm Teflon filter, so that a magenta ink No. I-3 according to the present invention was obtained.

| | wt. % |
|---|---|
| Magenta pigment dispersion No. I-3 | 20.0 |
| 1,5-pentanediol | 10.0 |
| Compound. No. (I)-1 | 0.5 |
| 2-ethyl-1,3-hexanediol | 2.0 |
| Deionized water | Balance |

The average particle size of the magenta pigment in the magenta ink No. I-3 was measured. The results are shown in TABLE 1.

EXAMPLE 22
[Preparation of Magenta Ink No. I-4]

A mixture of the following components was first roughly dispersed in a homogenizer and then finely dispersed in a commercially available fine grinding mill "Nanomizer" (trademark), whereby a magenta pigment dispersion No. I-4 was prepared.

| | wt. % |
|---|---|
| C.I. Pigment Red 122 | 15.0 |
| C.I. Pigment Violet 19 | 5.0 |
| Glycerin | 10.0 |
| Potassium salt of compound No. (II)-1 | 4.0 |
| Deionized water | Balance |

The following components were mixed and stirred in the commercially available fine grinding mill "Nanomizer" (trademark). The pH of the mixture was found to be 8.2. The resultant mixture was filtered through a 0.8-μm Teflon filter, so that a magenta ink No. I-4 according to the present invention was obtained.

| | wt. % |
|---|---|
| Magenta pigment dispersion No. I-4 | 20.0 |
| Polyethylene glycol (average molecular weight: 200) | 10.0 |
| Sodium benzoate | 1.0 |
| Deionized water | Balance |

The average particle size of the magenta pigment in the magenta ink No. I-4 was measured. The results are shown in TABLE 1.

EXAMPLE 23
[Preparation of Cyan Ink No. I-2]

A mixture of the following components was first roughly dispersed in a homogenizer and then finely dispersed in a commercially available fine grinding mill "Nanomizer" (trademark), whereby a cyan pigment dispersion No. I-2 was prepared.

| | wt. % |
|---|---|
| C.I. Pigment Blue 15:3 | 20.0 |
| Compound No. (III)-2 | 5.0 |
| Deionized water | Balance |

The following components were mixed and stirred in the commercially available fine grinding mill "Nanomizer" (trademark). The pH of the mixture was found to be 8.2. The resultant mixture was filtered through a 0.8-μm Teflon filter, so that a cyan ink No. I-2 according to the present invention was obtained.

| | wt. % |
|---|---|
| Cyan pigment dispersion No. I-2 | 20.0 |
| Glycerin | 5.0 |
| 1,5-pentanediol | 10.0 |
| Penetrating agent represented by formula (IX)-2 | 0.3 |
| 2,2,4-trimethyl-1,3-pentanediol | 2.0 |
| Deionized water | Balance |

The average particle size of the cyan pigment in the cyan ink No. I-2 was measured. The results are shown in TABLE 1.

EXAMPLE 24
[Preparation of Cyan Ink No. I-3]

A mixture of the following components was first roughly dispersed in a homogenizer and then finely dispersed in a commercially available fine grinding mill "Nanomizer" (trademark), whereby a cyan pigment dispersion No. I-3 was prepared.

| | wt. % |
|---|---|
| C.I. Pigment Blue 15:3 | 20.0 |
| Compound No. (II)-2 | 5.0 |
| Deionized water | Balance |

The following components were mixed and stirred in the commercially available fine grinding mill "Nanomizer" (trademark). The pH of the mixture was found to be 8.1. The resultant mixture was filtered through a 0.8-μm Teflon filter, so that a cyan ink No. I-3 according to the present invention was obtained.

| | wt. % |
|---|---|
| Cyan pigment dispersion No. I-3 | 20.0 |
| Glycerin | 5.0 |
| Polyethylene glycol (average molecular weight: 200) | 10.0 |
| Penetrating agent represented by formula (VII) wherein R = C$_9$H$_{19}$ and k = 8 | 1.0 |
| Deionized water | Balance |

The average particle size of the cyan pigment in the cyan ink No. I-3 was measured. The results are shown in TABLE 1.

EXAMPLE 25
[Preparation of Cyan Ink No. I-4]

A mixture of the following components was first roughly dispersed in a homogenizer and then finely dispersed in a commercially available fine grinding mill "Nanomizer" (trademark), whereby a cyan pigment dispersion No. I-4 was prepared.

| | wt. % |
|---|---|
| C.I. Pigment Blue 15:4 | 20.0 |
| Glycerin | 10.0 |
| Compound No. (III)-2 | 5.0 |
| Deionized water | Balance |

The following components were mixed and stirred in the commercially available fine grinding mill "Nanomizer" (trademark). The pH of the mixture was adjusted to 10.1 by adding thereto the compound No. (V)-1. The resultant mixture was filtered through a 0.8-μm Teflon filter, so that a cyan ink No. I-4 according to the present invention was obtained.

| | wt. % |
|---|---|
| Cyan pigment dispersion No. I-4 | 20.0 |
| Glycerin | 3.0 |
| Diethylene glycol | 10.0 |
| 2-pyrrolidone | 5.0 |
| Compound No. (I)-3 | 0.5 |
| 2-ethyl-1,3-hexanediol | 2.0 |
| Deionized water | Balance |

The average particle size of the cyan pigment in the cyan ink No. I-4 was measured. The results are shown in TABLE 1.

Comparative Example 1
[Preparation of Comparative Yellow Ink No. I-1]

A mixture of the following components was first roughly dispersed in a homogenizer and then finely dispersed in a commercially available fine grinding mill "Nanomizer" (trademark), whereby a yellow pigment dispersion No. I-20 was prepared.

| | wt. % |
|---|---|
| C.I. Pigment Yellow 74 | 20.0 |
| Glycerin | 10.0 |
| Ammonium salt of compound No. (III)-3 | 5.0 |
| Deionized water | Balance |

The following components were mixed and stirred in the commercially available fine grinding mill "Nanomizer" (trademark). The pH of the mixture was found to be 8.7. The resultant mixture was filtered through a 0.8-μm Teflon filter, so that a comparative yellow ink No. I-1 was obtained.

| | wt. % |
|---|---|
| Yellow pigment dispersion No. I-20 | 20.0 |
| Diethylene glycol | 15.0 |
| Sodium benzoate | 0.5 |
| Deionized water | Balance |

The average particle size of the yellow pigment in the comparative yellow ink No. I-1 was measured. The results are shown in TABLE 1.

[Preparation of Comparative Magenta Ink No. I-1]

A mixture of the following components was first roughly dispersed in a homogenizer and then finely dispersed in a commercially available fine grinding mill "Nanomizer" (trademark), whereby a magenta pigment dispersion No. I-5 was prepared.

|  | wt. % |
|---|---|
| C.I. Pigment Red 122 | 20.0 |
| Styrene/maleic anhydride copolymer | 5.0 |
| Deionized water | Balance |

Thereafter, the following components were mixed and stirred, and the pH of the mixture was adjusted to 9.0 by adding thereto lithium hydroxide. The resultant mixture was filtered through a 0.8-$\mu$m Teflon filter, so that a comparative magenta ink No. I-1 was obtained.

|  | wt. % |
|---|---|
| Magenta pigment dispersion No. I-5 | 20.0 |
| 2-ethyl-1,3-hexanediol | 2.0 |
| Polypropylene glycol | 5.0 |
| Diethylene glycol | 5.0 |
| Deionized water | Balance |

[Preparation of Comparative Cyan Ink No. I-1]

A mixture of the following components was first roughly dispersed in a homogenizer and then finely dispersed in a commercially available fine grinding mill "Nanomizer" (trademark), whereby a cyan pigment dispersion No. I-5 was prepared.

|  | wt. % |
|---|---|
| C.I. Pigment Blue 15:3 | 20.0 |
| Styrene/maleic anhydride copolymer | 5.0 |
| Deionized water | Balance |

Thereafter, the following components were mixed and stirred, and the pH of the mixture was adjusted to 9.0 by adding thereto lithium hydroxide. The resultant mixture was filtered through a 0.8-$\mu$m Teflon filter, so that a comparative cyan ink No. I-1 was obtained.

|  | wt. % |
|---|---|
| Cyan pigment dispersion No. I-5 | 10.0 |
| 2-ethyl-1,3-hexanediol | 2.0 |
| Polypropylene glycol | 5.0 |
| Diethylene glycol | 5.0 |
| Deionized water | Balance |

Comparative Example 2
[Preparation of Comparative Yellow Ink No. I-2]

A mixture of the following components was first roughly dispersed in a homogenizer and then finely dispersed in a commercially available fine grinding mill "Nanomizer" (trademark), whereby a yellow pigment dispersion No. I-21 was prepared.

|  | wt. % |
|---|---|
| C.I. Pigment Yellow 138 | 20.0 |
| Sodium lauryl phosphate | 5.0 |
| Deionized water | Balance |

The following components were mixed and stirred in the commercially available fine grinding mill "Nanomizer" (trademark). The pH of the mixture was found to be 8.6. The resultant mixture was filtered through a 0.8-$\mu$m Teflon filter, so that a comparative yellow ink No. I-2 was obtained.

|  | wt. % |
|---|---|
| Yellow pigment dispersion No. I-21 | 20.0 |
| Glycerin | 5.0 |
| Diethylene glycol | 10.0 |
| 2-pyrrolidone | 5.0 |
| Deionized water | Balance |

The average particle size of the yellow pigment in the comparative yellow ink No. I-2 was measured. The results are shown in TABLE 1.

Comparative Example 3
[Preparation of Comparative Yellow Ink No. I-3]

A mixture of the following components was first roughly dispersed in a homogenizer and then finely dispersed in a commercially available fine grinding mill "Nanomizer" (trademark), whereby a yellow pigment dispersion No. I-22 was prepared.

|  | wt. % |
|---|---|
| C.I. Pigment Yellow 138 | 20.0 |
| Glycerin | 10.0 |
| Sorbitan oleate | 5.0 |
| Deionized water | Balance |

The following components were mixed and stirred in the commercially available fine grinding mill "Nanomizer" (trademark). The pH of the mixture was sound to be 8.4. The resultant mixture was filtered through a 0.8-$\mu$m Teflon filter, so that a comparative yellow ink No. I-3 was obtained.

|  | wt. % |
|---|---|
| Yellow pigment dispersion No. I-22 | 25.0 |
| Diethylene glycol | 15.0 |
| Compound No. (I)-1 | 0.5 |
| Deionized water | Balance |

The average particle size of the yellow pigment in the comparative yellow ink No. I-3 was measured. The results are shown in TABLE 1.

Comparative Example 4
[Preparation of Comparative Yellow Ink No. I-4]

A mixture of the following components was first roughly dispersed in a homogenizer and then finely dispersed in a commercially available fine grinding mill "Nanomizer" (trademark), whereby a yellow pigment dispersion No. I-23 was prepared.

| | wt. % |
|---|---|
| C.I. Pigment Yellow 128 | 20.0 |
| Sodium lauryl phosphate | 5.0 |
| Deionized water | Balance |

The following components were mixed and stirred in the commercially available fine grinding mill "Nanomizer" (trademark). The pH of the mixture was found to be 8.4. The resultant mixture was filtered through a 0.8-μm Teflon filter, so that a comparative yellow ink No. I-4 was obtained.

| | wt. % |
|---|---|
| Yellow pigment dispersion No. I-23 | 20.0 |
| Glycerin | 5.0 |
| Diethylene glycol | 10.0 |
| 2-pyrrolidone | 5.0 |
| Deionized water | Balance |

The average particle size of the yellow pigment in the comparative yellow ink No. I-4 was measured. The results are shown in TABLE 1.

Comparative Example 5
[Preparation of Comparative Yellow Ink No. I-5]

A mixture of the following components was first roughly dispersed in a homogenizer and then finely dispersed in a commercially available fine grinding mill "Nanomizer" (trademark), whereby a yellow pigment dispersion No. I-24 was prepared.

| | wt % |
|---|---|
| C.I. Pigment Yellow 151 | 20.0 |
| Glycerin | 10.0 |
| Sorbitan oleate | 5.0 |
| Deionized water | Balance |

The following components were mixed and stirred in the commercially available fine grinding mill "Nanomizer" (trademark). The pH of the mixture was found to be 8.5. The resultant mixture was filtered through a 0.8-μm Teflon filter, so that a comparative yellow ink No. I-5 was obtained.

| | wt. % |
|---|---|
| Yellow pigment dispersion No. I-24 | 25.0 |
| Diethylene glycol | 15.0 |
| Compound No. (I)-1 | 0.5 |
| Deionized water | Balance |

The average particle size of the yellow pigment in the comparative yellow ink No. I-5 was measured. The results are shown in TABLE 1.

Using each of the ink compositions prepared in Examples 1 to 25 and Comparative Examples 1 to 5, a variety of tests were conducted to evaluate the following properties. The results are shown in TABLE 1.

(1) Color Tone

Each of the yellow ink compositions prepared in Examples 1 to 19 was set in a commercially available ink-jet printer "IPSiO Jet-300" (trademark), made by Ricoh Company, Ltd., together with the magenta ink No. I-1 and the cyan ink No. I-1 both prepared in Example 1. Each of the magenta ink compositions prepared in Examples 20 to 22 was set together with the yellow ink No. I-1 prepared in Example 1 and the cyan ink No. I-2 prepared in Example 23. Each of the cyan ink compositions prepared in Examples 23 to 25 was set together with the yellow ink No. I-1 prepared in Example 1 and the magenta ink No. I-2 prepared in Example 20. Each of the comparative yellow ink compositions prepared in Comparative Examples 1 to 5 was set together with the comparative magenta and cyan ink compositions both prepared in Comparative Example 1.

In any case, solid image samples of a yellow color, a magenta color, a cyan color, a red color, a green color, and a blue color were formed on commercially available plain paper.

The color tone of each solid color image sample was evaluated by measuring the reflection spectrum from the image sample using a reflection color spectrocolorimeter (manufactured by X-Rite, Incorporated). The lightness index $L^*$ and the chromaticness indices $a^*$ and $b^*$ in the chromaticity coordinates of CIE 1976 $L^*a^*b^*$ color space were obtained under the conditions that a light source of $D_{50}$ was employed and the field of view was adjusted to 2°. The color difference ($\Delta E$) between the measured value and the value of Japan Color ver. 2 (specified by ISO/TC130) was obtained in accordance with the following formula:

$$\Delta E = ((\Delta L^*)^2 + (\Delta a^*)^2 + (\Delta b^*)^2)^{1/2}$$

With respect to the yellow, magenta, and cyan colors, the color tone was evaluated as good when $\Delta E \leq 30$, and as excellent when $\Delta E \leq 25$; and with respect to the two-color superimposed solid image of red, green, and blue colors, the color tone was evaluated as good when $\Delta E \leq 50$, and as excellent when $\Delta E \leq 40$.

In TABLE 1, "◉" denotes excellent color tone, and "○" denotes good color tone.

(2) Color Tone of Composite Black Color

Using each set of color inks, a solid image of a composite black was produced on a sheet of plain paper in the same manner as mentioned above, using the commercially available ink-jet printer "IPSiO Jet-300" (trademark), made by Ricoh Company, Ltd. The color tone of the obtained composite black color was evaluated using the same reflection color spectrocolorimeter under the same conditions as mentioned above.

The color tone of the composite black color was judged in terms of saturation (C) from the CIE 1976 $L^*a^*b^*$ color space in accordance with the following formula:

$$\sqrt{(a^*)^2 + (b^*)^2} < 3$$

Namely, when the saturation (C) was less than 3, the color tone of the composite black color was evaluated as acceptable for practical use, and represented by "○" in TABLE 1; and when the saturation (C) was 3 or more, the color tone of the composite black color was evaluated as unacceptable for practical use, and represented by "X" in TABLE 1.

(3) Transparency

In the same manner as in the above-mentioned evaluation of color tone, solid image samples of a yellow color, a magenta color, a cyan color, a red color, a green color, and a blue color were formed on a commercially available transparent film for the OHP. The haze of the printed solid image was measured using a commercially available haze meter made by Suga Test Instruments Co., Ltd.

With respect to the image samples of the primary colors such as yellow, magenta and cyan, when the haze was 20 or less, the transparency was evaluated as acceptable for practical use, and expressed by "○" in TABLE 1; and when the haze was more than 20, the transparency was evaluated as unacceptable for practical use, and expressed by "X" in TABLE 1.

With respect to the image samples of the secondary colors such as red, green, and blue, when the haze was 30 or less, the transparency was evaluated as acceptable for practical use, and expressed by "○" in TABLE 1; and when the haze was more than 30, the transparency was evaluated as unacceptable for practical use, and expressed by "X" in TABLE 1.

(4) Image Density and Strike-Through Density

The optical density (OD) of the solid image sample formed on the plain paper using each color ink composition (yellow, magenta or cyan) was measured using a reflection color spectrocolorimeter (manufactured by X-Rite, Incorporated) in a mode of "STATUS T."

With respect to the image density, the optical density (OD) of the solid image of a yellow color was evaluated as acceptable for practical use when OD≧0.8, and the optical densities (OD) of the solid images of magenta and cyan colors were evaluated as acceptable when OD≧1.0.

In addition, to evaluate the strike-through phenomenon, the optical density ($OD_i$) of a portion corresponding to each of the solid color image portions (yellow, magenta, cyan, red, and green color solid image portions) and the optical density ($OD_b$) of a portion corresponding to the background portion were measured on the rear surface of the solid-image bearing sheet. The strike-through density ($OD_r$) was expressed by a difference between the optical densities ($OD_i$) and ($OD_b$).

When the strike-through of a red image portion was examined, the higher optical density value was selected from the densities of yellow color and magenta color. For the strike-through of a green image portion, the higher optical density value was selected from the densities of yellow color and cyan color.

The strike-through density ($OD_r$) was evaluated as acceptable when ($OD_r$)≦0.06.

In TABLE 1, "○" denotes the optical density or strike-through density acceptable for practical use, while "X" denotes the optical density or strike-through density not acceptable for practical use.

(5) Color Bleeding Between Black Ink Image and Primary Color Ink Image

Each of the color ink compositions and the black ink composition No. I-1 prepared in Example 1 were set in the same ink-jet printer as mentioned above. A solid image of a yellow, magenta, or cyan color and a solid image of a black color were printed side by side on a sheet of plain paper so that the two solid image areas came in contact with each other, and the degree of color bleeding was observed at the boundary between the two solid image areas.

The degree of color bleeding was evaluated on the following three scales:

○: Substantially no bleeding

Δ: Slight bleeding

X: Poor image quality by noticeable bleeding

The results are shown in TABLE 1.

(6) Light Resistance of Ink Images

The yellow, magenta, or cyan-color image bearing sample prepared in the evaluation of color tone was exposed to light of a xenon fade meter of 63° C. for 90 hours. Before and after the light exposure, the image density (ID) was measured using the same reflection color spectrocolorimeter as mentioned above (in "STATUS T" mode), and the light resistance was determined in terms of the fading ratio by percentage in accordance with the following formula:

$$\text{Fading Ratio (\%)} = \left[1 - \frac{\text{ID after light exposure}}{\text{ID before light exposure}}\right] \times 100$$

The results are shown in TABLE 1.

(7) Preservation Stability

Each ink composition was placed in a polyethylene container, and allowed to stand for 3 months under different conditions, that is, at −20° C., 4° C., 20° C., 50° C., and 70° C. The viscosity, surface tension, average particle diameter of pigment particles, and electroconductivity of the ink composition were measured, and the presence of precipitates in the ink composition was observed before and after the storage under the respective temperature conditions.

The preservation stability of ink was evaluated on the following scales:

⊚: There was no change in the above-mentioned physical properties and no precipitate in the ink after the storage under any conditions.

○: There was no change in the physical properties and no precipitate in the ink except that the average particle diameter of pigment particles increased to 200 nm or more.

X: Some precipitates were observed.

The results are shown in TABLE 1.

(8) Ink-Ejection Stability

After the solid color ink images were printed on plain paper in the evaluation of color tone as mentioned above, the ink-jet printing operation was stopped and the printer was allowed to stand at 20° C. and 65% RH for 2 months. Two months later, the printer was again driven to operate in order to examine whether the printing was being conducted normally or not.

In this test, the same ink image samples were produced using three ink-jet printers.

⊚: All the three ink-jet printers conducted normal ink-jet printing operation with neither clogging of nozzles with ink nor deviation from a predetermined direction into which the ink was to be ejected from the nozzle.

○: In one or two of the three ink-jet printers, the direction into which the ink was ejected was slightly deviated from a predetermined direction although nozzles were not clogged.

X: One or two of the three ink-jet printers did not achieve normal ink-jet printing operation because of the clogging of nozzles or considerably deviated direction of ink ejection from the nozzles.

(9) Average Particle Diameter of Pigment Particles

The average particle diameter of pigment particles in each ink composition was measured using "MICROTRAC UPA150" (trademark), made by Leeds & Northrup Co., Ltd.

The results are shown in TABLE 1.

(10) Surface Tension

The surface tension of each ink composition was measured by Wilhelmy plate method. The results are shown in TABLE 1.

TABLE 1

| | Color Tone | | | | | | | Transparency | | | | | | Image Density Primary color | Strike-through Density | | | Bleeding | Fading Ratio (%) | Preservation Stability | Ejection Stability | Surface Tension (mN/m) | Average Particle Diameter (nm) |
|---|---|---|---|---|---|---|---|---|---|---|---|---|---|---|---|---|---|---|---|---|---|---|---|
| | | | | | | | | | | | | | | | Primary color | R | G | | | | | | |
| | Y | M | C | R | G | B | BK* | Y | M | C | R | G | B | | | | | | | | | | |
| Ex. 1 | ○ | ◎ | ◎ | ◎ | ◎ | ◎ | ◎ | ○ | ○ | ○ | ○ | ○ | ○ | ○ | ○ | ○ | ○ | △ | 0.8 | ○ | ○ | 33.1 | 137.9 |
| Ex. 2 | ◎ | | | ◎ | ◎ | ○ | | ○ | ○ | | | | | ○ | ○ | ○ | ○ | △ | 1.0 | ◎ | ○ | 32.7 | 124.1 |
| Ex. 3 | ◎ | | | ◎ | ◎ | | | ○ | ○ | | | | | ○ | ○ | ○ | ○ | △ | 1.3 | ◎ | ◎ | 31.4 | 106.7 |
| Ex. 4 | ◎ | | | ◎ | ◎ | | | ○ | ○ | | | | | ○ | ○ | ○ | ○ | △ | 1.0 | ◎ | ◎ | 32.8 | 117.2 |
| Ex. 5 | ◎ | | | ◎ | ◎ | | | ○ | ○ | | | | | ○ | ○ | ○ | ○ | △ | 1.1 | ◎ | ◎ | 33.6 | 118.4 |
| Ex. 6 | ○ | | | ○ | ○ | | | ○ | ○ | | | | | ○ | ○ | ○ | ○ | △ | 0.8 | ◎ | ○ | 31.8 | 136.7 |
| Ex. 7 | ◎ | | | ◎ | ◎ | | | ○ | ○ | | | | | ○ | ○ | ○ | ○ | ○ | 0.7 | ◎ | ◎ | 30.4 | 113.1 |
| Ex. 8 | ◎ | | | ◎ | ◎ | | | ○ | ○ | | | | | ○ | ○ | ○ | ○ | ○ | 0.9 | ◎ | ◎ | 28.7 | 111.3 |
| Ex. 9 | ◎ | | | ◎ | ◎ | | | ○ | ○ | | | | | ○ | ○ | ○ | ○ | ○ | 1.3 | ◎ | ◎ | 30.4 | 117.6 |
| Ex. 10 | ◎ | | | ◎ | ◎ | | | ○ | ○ | | | | | ○ | ○ | ○ | ○ | ○ | 1.2 | ◎ | ○ | 29.9 | 117.7 |
| Ex. 11 | ○ | | | ○ | ○ | | | ○ | ○ | | | | | ○ | ○ | ○ | ○ | ○ | 0.6 | ◎ | ○ | 30.6 | 137.4 |
| Ex. 12 | ◎ | | | ◎ | ◎ | | | ○ | ○ | | | | | ○ | ○ | ○ | ○ | ○ | 1.4 | ◎ | ◎ | 30.8 | 109.3 |
| Ex. 13 | ◎ | | | ◎ | ◎ | | | ○ | ○ | | | | | ○ | ○ | ○ | ○ | ○ | 1.2 | ◎ | ◎ | 29.1 | 115.5 |
| Ex. 14 | ◎ | | | ◎ | ◎ | | | ○ | ○ | | | | | ○ | ○ | ○ | ○ | ○ | 1.2 | ◎ | ◎ | 30.9 | 99.7 |
| Ex. 15 | ◎ | | | ◎ | ◎ | | | ○ | ○ | | | | | ○ | ○ | ○ | ○ | ○ | 1.3 | ◎ | ◎ | 30.4 | 96.7 |
| Ex. 16 | ◎ | | | ◎ | ◎ | | | ○ | ○ | | | | | ○ | ○ | ○ | ○ | ○ | 0.8 | ◎ | ◎ | 29.2 | 95.4 |
| Ex. 17 | ◎ | | | ◎ | ◎ | | | ○ | ○ | | | | | ○ | ○ | ○ | ○ | ○ | 1.1 | ◎ | ◎ | 28.8 | 111.0 |
| Ex. 18 | ◎ | | | ◎ | ◎ | | | ○ | ○ | | | | | ○ | ○ | ○ | ○ | △ | 0.2 | ◎ | ◎ | 30.5 | 110.5 |
| Ex. 19 | ◎ | | | ◎ | ◎ | | | ○ | ○ | | | | | ○ | ○ | ○ | ○ | ○ | 0.3 | ◎ | ◎ | 30.9 | 108.7 |
| Ex. 20 | | ◎ | | ◎ | ◎ | ◎ | | | ○ | | ○ | ○ | ○ | ○ | ○ | ○ | ○ | △ | 0.2 | ◎ | ◎ | 30.1 | 113.1 |
| Ex. 21 | | ◎ | | ◎ | ◎ | ◎ | | | ○ | | ○ | ○ | ○ | ○ | ○ | ○ | ○ | 0.3 | ◎ | ◎ | 30.6 | 107.6 |
| Ex. 22 | | ◎ | | ◎ | ◎ | ◎ | | | ○ | | ○ | ○ | ○ | ○ | ○ | ○ | ○ | 0.4 | ◎ | ◎ | 29.1 | 106.2 |
| Ex. 23 | | | ◎ | ◎ | ◎ | ◎ | | | | ○ | ○ | ○ | ○ | ○ | ○ | ○ | ○ | 0.3 | ◎ | ◎ | 30.6 | 96.4 |
| Ex. 24 | | | ◎ | ◎ | ◎ | ◎ | | | | ○ | ○ | ○ | ○ | ○ | ○ | ○ | ○ | 0.5 | ◎ | ◎ | 28.9 | 90.4 |
| EX. 25 | | | ◎ | ◎ | ◎ | ◎ | | | | ○ | ○ | ○ | ○ | ○ | ○ | ○ | ○ | 0.2 | ◎ | ◎ | 29.3 | 101.7 |
| Comp. Ex. 1 | ○ | ○ | ○ | ○ | ○ | ○ | ○ | × | ○ | ○ | × | × | ○ | × | × | × | × | △ | 27.5 | ○ | × | 32.6 | 123.6 |
| Comp. Ex. 2 | ○ | | | ○ | ○ | | | ○ | ○ | | | | | × | ○ | ○ | ○ | × | 1.1 | × | ○ | 45.5 | 148.7 |
| Comp. Ex. 3 | ○ | | | ○ | ○ | | | × | × | | | | | × | × | × | × | ○ | 0.9 | × | × | 33.7 | 232.5 |
| Comp. Ex. 4 | ○ | | | ○ | ○ | | | × | × | | | | | × | × | × | × | ○ | 0.3 | × | ○ | 44.9 | 169.6 |
| Comp. Ex. 5 | ○ | | | ○ | ○ | | | × | × | | | | | × | × | × | × | ○ | 0.3 | × | × | 32.8 | 222.1 |

*"BK" denotes a composite black color.

EXAMPLE 26

[Preparation of Yellow Ink No. II-1]

The following components were roughly dispersed in a homogenizer, and thereafter finely pulverized in the commercially available fine grinding mill "Nanomizer" (trademark), so that a yellow pigment dispersion No. II-1 was prepared.

| | wt. % |
|---|---|
| Azo compound (A)-1 | 10.0 |
| Anionic surfactant (dispersing agent) represented by $C_8H_{17}O(CH_2CH_2O)_{5.2}SO_3NH_3$ | 5.0 |
| Deionized water | Balance |

The following components were mixed and stirred in the commercially available fine grinding mill "Nanomizer" (trademark), and the resultant mixture was filtered through a 0.8-$\mu$m Teflon filter, so that a yellow ink No. II-1 according to the present invention was obtained.

| | wt. % |
|---|---|
| Yellow pigment dispersion No. II-1 | 50.0 |
| Polyoxyethylene polyoxypropylene glycol (Compound No. (IX)-1) | 0.3 |
| 2-ethyl-1,3-hexanediol | 2.0 |
| Diethylene glycol | 10.0 |
| 2-pyrrolidone | 5.0 |
| Deionized water | Balance |

The average particle size of the yellow pigment in the yellow ink No. II-1 was measured. The results are shown in TABLE 2.

EXAMPLE 27

[Preparation of Yellow Ink No. II-2]

The following components were roughly dispersed in a homogenizer, and thereafter finely pulverized in the commercially available fine grinding mill "Nanomizer" (trademark), so that a yellow pigment dispersion No. II-2 was prepared.

|  | wt. % |
|---|---|
| Azo compound (A)-2 | 10.0 |
| Anionic surfactant (dispersing agent) represented by $CH_3(CH_2)_7CH\!=\!CH(CH_2)_8O(CH_2CH_2O)_{52}PO_3NH_3$ | 5.0 |
| Deionized water | Balance |

The following components were mixed and stirred in the commercially available fine grinding mill "Nanomizer" (trademark), and the resultant mixture was filtered through a 0.8-μm Teflon filter, so that a yellow ink No. II-2 according to the present invention was obtained.

|  | wt. % |
|---|---|
| Yellow pigment dispersion No. II-2 | 40.0 |
| Polyoxyethylene polyoxypropylene glycol (Compound No. (IX)-2) | 0.3 |
| 2,2,4-trimethyl-1,3-pentanediol | 2.0 |
| Polyethylene glycol (average molecular weight: 200) | 15.0 |
| 2-pyrrolidone | 5.0 |
| Deionized water | Balance |

The average particle size of the yellow pigment in the yellow ink No. II-2 was measured. The results are shown in TABLE 2.

EXAMPLE 28
[Preparation of Yellow Ink No. II-3]

The following components were roughly dispersed in a homogenizer, and thereafter finely pulverized in the commercially available fine grinding mill "Nanomizer" (trademark), so that a yellow pigment dispersion No. II-3 was prepared.

|  | wt. % |
|---|---|
| Azo compound (A)-3 | 10.0 |
| Anionic surfactant (dispersing agent) represented by $C_2H_5(C_2H_5)C_{12}H_{25}C_6H_5O(CH_2CH_2O)_{84}SO_3Na$ | 5.0 |
| Deionized water | Balance |

The following components were mixed and stirred in the commercially available fine grinding mill "Nanomizer" (trademark), and the resultant mixture was filtered through a 0.8-μm Teflon filter, so that a yellow ink No. II-3 according to the present invention was obtained.

|  | wt. % |
|---|---|
| Yellow pigment dispersion No. II-3 | 50.0 |
| Polyoxyethylene polyoxypropylene glycol (Compound No. (IX)-3) | 0.3 |
| 2,2,4-trimethyl-1,3-pentanediol | 2.0 |
| Glycerin | 5.0 |
| 2-pyrrolidone | 0.5 |
| Deionized water | Balance |

The average particle size of the yellow pigment in the yellow ink No. II-3 was measured. The results are shown in TABLE 2.

EXAMPLE 29
[Preparation of Yellow Ink No. II-4]

The following components were roughly dispersed in a homogenizer, and thereafter finely pulverized in the commercially available fine grinding mill "Nanomizer" (trademark), so that a yellow pigment dispersion No. II-4 was prepared.

|  | wt. % |
|---|---|
| Azo compound (A)-4 | 10.0 |
| Anionic surfactant (dispersing agent) represented by $C_9H_{19}C_6H_5O(CH_2CH_2O)_{31}PO_3N(C_2H_5)_3$ | 5.0 |
| Deionized water | Balance |

The following components were mixed and stirred in the commercially available fine grinding mill "Nanomizer" (trademark), and the resultant mixture was filtered through a 0.8-μm Teflon filter, so that a yellow ink No. II-4 according to the present invention was obtained.

|  | wt. % |
|---|---|
| Yellow pigment dispersion No. II-4 | 40.0 |
| Polyoxyethylene polyoxypropylene glycol (Compound No. (IX)-4) | 0.3 |
| 2,2,4-trimethyl-1,3-pentanediol | 2.0 |
| Glycerin | 5.0 |
| Diethylene glycol | 5.0 |
| 2-pyrrolidone | 5.0 |
| Deionized water | Balance |

The average particle size of the yellow pigment in the yellow ink No. II-4 was measured. The results are shown in TABLE 2.

EXAMPLE 30
[Preparation of Yellow Ink No. II-5]

The following components were roughly dispersed in a homogenizer, and thereafter finely pulverized in the commercially available fine grinding mill "Nanomizer" (trademark), so that a yellow pigment dispersion No. II-5 was prepared.

|  | wt. % |
|---|---|
| Azo compound (A)-5 | 10.0 |
| Anionic surfactant (dispersing agent) represented by $C_2H_5(C_2H_5)C_{12}H_{25}C_6H_5O$ | 5.0 |

-continued

| | wt. % |
|---|---|
| $(CH_2CH_2O)_{84}SO_3Na$ | |
| Deionized water | Balance |

The following components were mixed and stirred in the commercially available fine grinding mill "Nanomizer" (trademark), and the resultant mixture was filtered through a 0.8-μm Teflon filter, so that a yellow ink No. II-5 according to the present invention was obtained.

| | wt. % |
|---|---|
| Yellow pigment dispersion No. II-5 | 40.0 |
| Polyoxyethylene polyoxypropylene glycol (Compound No. (IX)-5) | 0.3 |
| 2-ethyl-1,3-hexanediol | 2.0 |
| Polypropylene glycol | 5.0 |
| Diethylene glycol | 5.0 |
| 2-pyrrolidone | 5.0 |
| Deionized water | Balance |

The average particle size of the yellow pigment in the yellow ink No. II-5 was measured. The results are shown in TABLE 2.

Using each of the yellow ink compositions prepared in Examples 26 to 30, a variety of tests were conducted to evaluate the following properties.

(1) Color Tone

Each of the yellow ink compositions prepared in Examples 26 to 30 was set in the commercially available ink-jet printer "IPSiO Jet-300" (trademark), made by Ricoh Company, Ltd., together with the magenta ink composition No. I-1 and the cyan ink composition No. I-1 both prepared in Example 1.

In any case, solid image samples of a yellow color, a magenta color, a cyan color, a red color, a green color, and a blue color were formed on commercially available plain paper.

The color tone of each solid color image sample was evaluated by measuring the reflection spectrum from the image sample using a reflection color spectrocolorimeter (manufactured by X-Rite, Incorporated). The lightness index L* and the chromaticness indices a* and b* in the chromaticity coordinates of CIE 1976 L*a*b* color space were obtained. The color difference (ΔE) between the measured value and the value of Japan Color ver. 2 (specified by ISO/TC130) was obtained in accordance with the following formula:

$$\Delta E=((\Delta L^*)^2+(\Delta a^*)^2+(\Delta b^*)^2)^{1/2}$$

With respect to the yellow color, the color tone was evaluated as acceptable for practical use when ΔE≦30; and with respect to the two-color superimposed colors (red, green, and blue), the color tone was evaluated as acceptable for practical use when $\Delta E_{aver} \leq 50$, wherein $\Delta E_{aver}$ is the average color difference obtained from the three colors (yellow, magenta, and cyan).

As a result, every yellow color and secondary color prepared by superimposing the two colors exhibited excellent color tone.

(2) Color Tone of Composite Black Color

Using each set of color inks, a solid image of a composite black color was produced on a sheet of plain paper in the same manner as mentioned above, using the commercially available ink-jet printer "IPSiO Jet-300" (trademark), made by Ricoh Company, Ltd. The color tone of the obtained composite black color was evaluated using the same reflection color spectrocolorimeter in the same manner as mentioned above.

As a result, the saturation (C) of every composite black color was less than 3, and the color tone of every composite black color was evaluated as acceptable for practical use.

(3) Transparency

The set of color ink compositions was set in the same commercially available ink-jet printer in the same manner as in the above-mentioned evaluation of color tone. Then, solid image samples of a yellow color, a magenta color, a cyan color, a red color, a green color, and a blue color were formed on a commercially available transparent film for the OHP. The haze of the printed solid image was measured using the same commercially available haze meter in the same manner as mentioned above.

With respect to every yellow color, the haze was 20 or less, and the transparency was evaluated as acceptable for practical use. With respect to every secondary color such as red, green, and blue, the haze was 30 or less, and the transparency was evaluated as acceptable for practical use.

(4) Image Density and Strike-Through Density

The optical density (OD) of each of the above-mentioned solid image samples of a yellow color, a red color, and a green color formed on plain paper was measured using a reflection color spectrocolorimeter (manufactured by X-Rite, Incorporated).

In addition, the strike-through density ($OD_r$) was expressed in the same manner as mentioned above.

As a result, the optical densities of all the yellow color images were as high as 0.8 or more, and evaluated as acceptable for practical use. The strike-through densities ($OD_r$) for yellow, red and green images were all 0.06 or less, so that the strike-through densities were also evaluated as acceptable for practical use.

(5) Light Resistance of Ink Images

The yellow-color image bearing sample prepared in the evaluation of color tone was exposed to light of a xenon fade meter of 63° C. for 90 hours. Before and after the light exposure, the image density (ID) was measured using the same reflection color spectrocolorimeter as mentioned above, and the light resistance was determined in terms of the fading ratio by percentage in the same manner as mentioned above.

The results are shown in TABLE 2.

(6) Preservation Stability

Each ink composition was placed in a polyethylene container, and allowed to stand for 3 months under different conditions, that is, at −20° C., 4° C., 20° C., 50° C., and 70° C. The change in viscosity, surface tension, and electroconductivity of the ink composition, and the presence of some precipitates were examined before and after the storage.

The preservation stability of each of the yellow ink compositions prepared in Examples 26 to 30 was evaluated as acceptable for practical use because there was no change in the physical properties and no precipitate in the ink after the storage under any temperature conditions.

(7) Ink-Ejection Stability

After the solid color ink images were printed on plain paper in the evaluation of color tone as mentioned above, the ink-jet printing operation was stopped and the printer was allowed to stand at 20° C. and 65% RH for 2 months. Two months later, the printer was again driven to operate in order to examine whether the printing was being conducted normally or not.

In this test, the same ink image samples were produced using three ink-jet printers.

Since all the three ink-jet printers achieved normal printing, the ink-ejection stability of each yellow ink composition was evaluated as acceptable for practical use.

(8) Average Particle Diameter of Pigment Particles

The average particle diameter of pigment particles in each ink composition was measured using "MICROTRAC UPA150" (trademark), made by Leeds & Northrup Co., Ltd.

The results are shown in TABLE 2.

TABLE 2

|  | Fading Ratio (%) | Average Particle Diameter (nm) |
|---|---|---|
| Ex. 26 | 1.5 | 121.5 |
| Ex. 27 | 1.7 | 168.8 |
| Ex. 28 | 1.2 | 136.1 |
| Ex. 29 | 1.6 | 140.2 |
| Ex. 30 | 1.4 | 114.2 |

EXAMPLE 31

[Preparation of Yellow Ink No. III-1]

The following components were roughly dispersed in a homogenizer, and thereafter finely pulverized in the commercially available fine grinding mill "Nanomizer" (trademark), so that a yellow pigment dispersion No. III-1 was prepared.

|  | wt. % |
|---|---|
| C.I. Pigment Yellow 150 | 10.0 |
| Anionic surfactant (dispersing agent) represented by $C_{10}H_{21}O(CH_2CH_2O)_{20}CO_2Na$ | 5.0 |
| Deionized water | Balance |

The following components were mixed and stirred in the commercially available fine grinding mill "Nanomizer" (trademark), and the resultant mixture was filtered through a 0.8-$\mu$m Teflon filter, so that a yellow ink No. III-1 according to the present invention was obtained.

|  | wt. % |
|---|---|
| Yellow pigment dispersion No. III-1 | 50.0 |
| Polyoxyethylene polyoxypropylene glycol (Compound No. (IX)-1) | 0.3 |
| 2-ethyl-1,3-hexanediol | 2.0 |
| Diethylene glycol | 10.0 |
| 2-pyrrolidone | 5.0 |
| Deionized water | Balance |

The average particle size of the yellow pigment in the yellow ink No. III-1 was measured. The results are shown in TABLE 3.

EXAMPLE 32

[Preparation of Yellow Ink No. III-2]

The following components were roughly dispersed in a homogenizer, and thereafter finely pulverized in the commercially available fine grinding mill "Nanomizer" (trademark), so that a yellow pigment dispersion No. III-2 was prepared.

|  | wt. % |
|---|---|
| C.I. Pigment Yellow 150 | 10.0 |
| Anionic surfactant (dispersing agent) represented by $C_9H_{19}C_6H_5O(CH_2CH_2O)_{31}SO_3NH_2(CH_3)$ | 5.0 |
| Deionized water | Balance |

The following components were mixed and stirred in the commercially available fine grinding mill "Nanomizer" (trademark), and the resultant mixture was filtered through a 0.8-$\mu$m Teflon filter, so that a yellow ink No. III-2 according to the present invention was obtained.

|  | wt. % |
|---|---|
| Yellow pigment dispersion No. III-2 | 40.0 |
| Polyoxyethylene polyoxypropylene glycol (Compound No. (IX)-2) | 0.3 |
| 2,2,4-trimethyl-1,3-pentanediol | 2.0 |
| Polyethylene glycol (average molecular weight: 200) | 15.0 |
| 2-pyrrolidone | 5.0 |
| Deionized water | Balance |

The average particle size of the yellow pigment in the yellow ink No. III-2 was measured. The results are shown in TABLE 3.

EXAMPLE 33

[Preparation of Yellow Ink No. III-3]

The following components were roughly dispersed in a homogenizer, and thereafter finely pulverized in the commercially available fine grinding mill "Nanomizer" (trademark), so that a yellow pigment dispersion No. III-3 was prepared.

|  | wt. % |
|---|---|
| C.I. Pigment Yellow 150 | 10.0 |
| Anionic surfactant (dispersing agent) represented by $C_{12}H_{25}C_6H_5O(CH_2CH_2O)_{84}PO_3Na$ | 5.0 |
| Deionized water | Balance |

The following components were mixed and stirred in the commercially available fine grinding mill "Nanomizer" (trademark), and the resultant mixture was filtered through a 0.8-$\mu$m Teflon filter, so that a yellow ink No. III-3 according to the present invention was obtained.

|  | wt. % |
|---|---|
| Yellow pigment dispersion No. III-3 | 50.0 |
| Polyoxyethylene polyoxypropylene glycol (Compound No. (IX)-3) | 0.3 |
| 2,2,4-trimethyl-1,3-pentanediol | 2.0 |
| Glycerin | 5.0 |

-continued

| | wt. % |
|---|---|
| 2-pyrrolidone | 0.5 |
| Deionized water | Balance |

The average particle size of the yellow pigment in the yellow ink No. III-3 was measured. The results are shown in TABLE 3.

EXAMPLE 34
[Preparation of Yellow Ink No. III-4]

The following components were roughly dispersed in a homogenizer, and thereafter finely pulverized in the commercially available fine grinding mill "Nanomizer" (trademark), so that a yellow pigment dispersion No. III-4 was prepared.

| | wt. % |
|---|---|
| C.I. Pigment Yellow 150 | 10.0 |
| Polyoxyethylene polyoxypropylene octyl ether | 5.0 |
| Deionized water | Balance |

The following components were mixed and stirred in the commercially available fine grinding mill "Nanomizer" (trademark), and the resultant mixture was filtered through a 0.8-μm Teflon filter, so that a yellow ink No. III-4 according to the present invention was obtained.

| | wt. % |
|---|---|
| Yellow pigment dispersion No. III-4 | 40.0 |
| Polyoxyethylene polyoxypropylene glycol (Compound No. (IX)-4) | 0.3 |
| 2,2,4-trimethyl-1,3-pentanediol | 2.0 |
| Glycerin | 5.0 |
| Diethylene glycol | 5.0 |
| 2-pyrrolidone | 5.0 |
| Deionized water | Balance |

The average particle size of the yellow pigment in the yellow ink No. III-4 was measured. The results are shown in TABLE 3.

EXAMPLE 35
[Preparation of Yellow Ink No. III-5]

The following components were roughly dispersed in a homogenizer, and thereafter finely pulverized in the commercially available fine grinding mill "Nanomizer" (trademark), so that a yellow pigment dispersion No. III-5 was prepared.

| | wt. % |
|---|---|
| C.I. Pigment Yellow 150 | 10.0 |
| Nonylphenyl polyoxy ether | 5.0 |
| Deionized water | Balance |

The following components were mixed and stirred in the commercially available fine grinding mill "Nanomizer" (trademark), and the resultant mixture was filtered through a 0.8-μm Teflon filter, so that a yellow ink No. III-5 according to the present invention was obtained.

| | wt. % |
|---|---|
| Yellow pigment dispersion No. III-5 | 40.0 |
| Polyoxyethylene polyoxypropylene glycol (Compound No. (IX)-5) | 0.3 |
| 2-ethyl-1,3-hexanediol | 2.0 |
| Polypropylene glycol | 5.0 |
| Diethylene glycol | 5.0 |
| 2-pyrrolidone | 5.0 |
| Deionized water | Balance |

The average particle size of the yellow pigment in the yellow ink No. III-5 was measured. The results are shown in TABLE 3.

Comparative Example 13
[Preparation of Comparative Yellow Ink No. III-1]

The following components were roughly dispersed in a homogenizer, and thereafter finely pulverized in the commercially available fine grinding mill "Nanomizer" (trademark), so that a yellow pigment dispersion No. III-6 was prepared.

| | wt. % |
|---|---|
| C.I. Pigment Yellow 150 | 10.0 |
| Lauryl trimethyl ammonium chloride | 5.0 |
| Deionized water | Balance |

The following components were mixed and stirred in the commercially available fine grinding mill "Nanomizer" (trademark), and the resultant mixture was filtered through a 0.8-μm Teflon filter, so that a comparative yellow ink No. III-1 was obtained.

| | wt. % |
|---|---|
| Yellow pigment dispersion No. III-6 | 50.0 |
| 2-ethyl-1,3-hexanediol | 2.0 |
| Polyoxyethylene polyoxypropylene glycol (Compound No. (IX)-1) | 0.3 |
| Diethylene glycol | 10.0 |
| 2-pyrrolidone | 5.0 |
| Deionized water | Balance |

The average particle size of the yellow pigment in the comparative yellow ink No. III-1 was measured. The results are shown in TABLE 3.

Using each of the yellow ink compositions prepared in Examples 31 to 35 and Comparative Example 13, a variety of tests were conducted to evaluate the following properties. The results are shown in TABLE 3.

(1) Color Tone

Each of the yellow ink compositions prepared in Examples 31 to 35 was set in the commercially available ink-jet printer "IPSiO Jet-300" (trademark), made by Ricoh Company, Ltd., together with the magenta ink No. I-1 and the cyan ink No. I-1 both prepared in Example 1. The comparative yellow ink composition No. III-1 prepared in Comparative Example 13 was set together with the comparative magenta and cyan ink compositions both prepared in Comparative Example 1.

In any case, solid image samples of a yellow color, a magenta color, a cyan color, a red color, a green color, and a blue color were formed on commercially available plain paper.

The color tone of each solid color image sample was evaluated by measuring the reflection spectrum from the image sample using a reflection color spectrocolorimeter (manufactured by X-Rite, Incorporated). The lightness index L* and the chromaticness indices a* and b* in the chromaticity coordinates of CIE 1976 L*a*b* color space were obtained. The color difference (ΔE) between the measured value and the value of Japan Color ver. 2 (specified by ISO/TC130) was obtained in accordance with the following formula:

$$\Delta E = ((\Delta L^*)^2 + (\Delta a^*)^2 + (\Delta b^*)^2)^{1/2}$$

With respect to the yellow color, the color tone was evaluated as acceptable for practical use when $\Delta E \leq 30$; and with respect to the two-color superimposed colors (red, green, and blue), the color tone was evaluated as acceptable for practical use when $\Delta E_{aver} \leq 50$, wherein $\Delta E_{aver}$ is the average color difference obtained from the three colors (yellow, magenta, and cyan).

In TABLE 3, "○" denotes color tone acceptable for practical use.

(2) Color Tone of Composite Black Color

Using each set of color inks, a solid image of a composite black was produced on a sheet of plain paper in the same manner as mentioned above, using the commercially available ink-jet printer "IPSiO Jet-300" (trademark), made by Ricoh Company, Ltd. The color tone of the obtained composite black color was evaluated using the same reflection color spectrocolorimeter in the same manner as mentioned above.

As a result, when the saturation (C) was less than 3, the color tone of the composite black color was evaluated as acceptable for practical use, and expressed by "○" in TABLE 3.

(3) Transparency

The set of color ink compositions was set in the same commercially available ink-jet printer in the same manner as in the above-mentioned evaluation of color tone. Then, solid image samples of a yellow color, a magenta color, a cyan color, a red color, a green color, and a blue color were formed on a commercially available transparent film for the OHP. The haze of the printed solid image was measured using the same haze meter in the same manner as mentioned above.

With respect to the yellow color, when the haze was 20 or less, the transparency was evaluated as acceptable for practical use, and expressed by "○" in TABLE 3.

With respect to the secondary colors such as red, green, and blue, when the haze was 30 or less, the transparency was evaluated as acceptable for practical use, and expressed by "○" in TABLE 3.

(4) Image Density and Strike-Through Density

The optical density (OD) of each of the above-mentioned solid image samples of a yellow color, a red color, and a green color formed on plain paper was measured using a reflection color spectrocolorimeter (manufactured by X-Rite, Incorporated).

In addition, the strike-through density ($OD_r$) was expressed in the same manner as mentioned above.

When the optical density of the yellow color was 0.8 or more, the optical density was evaluated as acceptable for practical use, and expressed by "○" in TABLE 3. When the strike-through density ($OD_r$) for yellow, red, and green images was 0.06 or less, the strike-through density was evaluated as acceptable for practical use, and expressed by "○" in TABLE 3. In contrast to this, when the strike-through density exceeded 0.06, the strike-through density was not acceptable for practical use, and expressed by "X" in TABLE 3.

(5) Color Bleeding Between Black Ink Image and Yellow Ink Image

Each of the yellow ink compositions and the black ink composition No. I-1 prepared in Example 1 were set in the same ink-jet printer as mentioned above. A solid image of a yellow color and a solid image of a black color were printed side by side on a sheet of plain paper so that the yellow image area and the black image area came in contact with each other, and the degree of color bleeding was observed at the boundary between the two color image areas.

The degree of color bleeding was evaluated on the following three scales:

○: Substantially no bleeding

Δ: Slight bleeding

X: Poor image quality by noticeable bleeding

The results are shown in TABLE 3.

(6) Light Resistance of Ink Images

The yellow-color image bearing sample prepared in the evaluation of color tone was exposed to light of a xenon fade meter of 63° C. for 90 hours. Before and after the light exposure, the image density (ID) was measured using the same reflection color spectrocolorimeter as mentioned above, and the light resistance was determined in terms of the fading ratio by percentage in the same manner as mentioned above.

The results are shown in TABLE 3.

(7) Preservation Stability

Each yellow ink composition was placed in a polyethylene container, and allowed to stand for 3 months under different conditions, that is, at −20° C., 4° C., 20° C., 50° C., and 70° C. The change in viscosity, surface tension, and electroconductivity of the ink composition, and the presence of some precipitates were examined before and after the storage.

The preservation stability of ink was evaluated as acceptable when there was no change in the above-mentioned physical properties and no precipitate in the ink after the storage under any conditions. In this case, the preservation stability is expressed by "○" in TABLE 3.

In contrast to the above, when there was observed some change under one or more temperature conditions, the preservation stability was evaluated as not acceptable for practical use. In this case, the preservation stability is expressed by "X" in TABLE 3.

(8) Ink-Ejection Stability

After the solid color ink images were printed on plain paper in the evaluation of color tone as mentioned above, the ink-jet printing operation was stopped and the printer was allowed to stand at 20° C. and 65% RH for 2 months. Two months later, the printer was again driven to operate in order to examine whether the printing was being conducted normally or not.

In this test, the same ink image samples were produced using three ink-jet printers.

When all the three ink-jet printers achieved normal printing, the ink-ejection stability was evaluated as acceptable, and represented by "○" in TABLE 3. In contrast to this, when one or two printers did not conduct normal ink-jet printing, the ink-ejection stability was evaluated as not acceptable, and represented by "X" in TABLE 3.

(8) Average Particle Diameter of Pigment Particles

The average particle diameter of pigment particles in each ink composition was measured using "MICROTRAC UPA150" (trademark), made by Leeds & Northrup Co., Ltd. The results are shown in TABLE 3.

TABLE 3

| | Color Tone | | | | | | Transparency | | | | | | Image Density | | | Strike-through Density | | | Bleed-ing | Fading Ratio (%) | Preservation Stability | Ejection Stability | Average Particle Diameter (nm) |
|---|---|---|---|---|---|---|---|---|---|---|---|---|---|---|---|---|---|---|---|---|---|---|---|
| | Y | M | C | R | G | B | BK* | Y | M | C | R | G | B | Y | R | G | Y | R | G | | | | | |
| Ex. 31 | ○ | ○ | ○ | ○ | ○ | ○ | ○ | ○ | ○ | ○ | ○ | ○ | ○ | ○ | ○ | ○ | ○ | ○ | ○ | ○ | 0.9 | ○ | ○ | 121.5 |
| Ex. 32 | ○ | | ○ | ○ | | ○ | ○ | | | ○ | ○ | | | ○ | ○ | ○ | ○ | ○ | ○ | ○ | 1.3 | ○ | ○ | 168.8 |
| Ex. 33 | ○ | | ○ | ○ | | ○ | ○ | | | ○ | ○ | | | ○ | ○ | ○ | ○ | ○ | ○ | ○ | 0.8 | ○ | ○ | 136.1 |
| Ex. 34 | ○ | | ○ | ○ | | ○ | ○ | | | ○ | ○ | | | ○ | ○ | ○ | ○ | ○ | ○ | ○ | 1.1 | ○ | ○ | 140.2 |
| Ex. 35 | ○ | | ○ | ○ | | ○ | ○ | | | ○ | ○ | | | ○ | ○ | ○ | ○ | ○ | ○ | ○ | 1.5 | ○ | ○ | 114.2 |
| Comp. Ex. 13 | ○ | | ○ | ○ | | ○ | ○ | | | ○ | ○ | | | ○ | ○ | ○ | ○ | ○ | ○ | X | 1.2 | X | X | 154.2 |

*"BK" denotes a composite black Color.

Japanese Patent Application No. 2000-198237 filed Jun. 30, 2000, Japanese Patent Application No. 2000-213657 filed Jul. 14, 2000, and Japanese Patent Application No. 2001-171286 filed Jun. 6, 2001 are hereby incorporated by reference.

What is claimed is:

1. An aqueous ink-jet composition, comprising:
   a coloring agent comprising at least one pigment selected from the group consisting of a condensed azo pigment, a condensed polycyclic pigment, a phthalocyanine pigment, and a nickel complex azo pigment;
   a dispersant for dispersing said coloring agent, comprising at least one surfactant selected from the group consisting of an anionic surfactant of formula (II) or (III):

  (II)

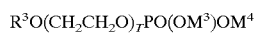  (III)

$R^2O(CH_2CH_2O)_qSO_3M^2$ (II)

$R^3O(CH_2CH_2O)_rPO(OM^3)OM^4$ (III)

wherein $R^2$ and $R^3$ are each an alkyl group having 4 to 24 carbon atoms, an alkylphenyl group or an alkylallyl group; $M^2$ and $M^4$ are each an alkali metal ion, a quaternary ammonium ion, a quaternary phosphonium ion or an alkanolamine ion; $M^3$ is hydrogen or $R(CH_2CH_2O)_T$ in which R is an alkyl group having from 1 to 4 carbon atoms, an alkylphenyl group or an alkylallyl group; q is an integer of 4 to 50 and r is an integer of 4 to 20;
   a wetting agent;
   a penetrating agent comprising at least one compound selected from the group consisting of a diol having 6 or more carbon atoms and a polyoxyethylene polyoxypropylene glycol represented by formula (IX):

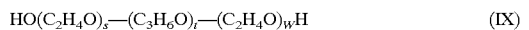

$HO(C_2H_4O)_s—(C_3H_6O)_t—(C_2H_4O)_wH$ (IX)

wherein t is an integer that can satisfy a condition that polyoxypropylene units have a molecular weight of 2500 or less in total; and s and u are each an integer that can satisfy a condition that the total molecular weight of polyoxyethylene units is 5 to 30% of the entire molecular weight of the polyoxyethylene polyoxypropylene glycol; and water, said ink composition having a surface tension of 20 mN/m or more and less than 35 mN/m.

2. The aqueous ink-jet composition as claimed in claim 1, wherein said pigment is selected from the group consisting of C.I. Pigment Yellow 128, C.I. Pigment Yellow 138, C.I. Pigment Yellow 151, C.I. Pigment Yellow 97, C.I. Pigment Yellow 150, C.I. Pigment Red 122, C.I. Pigment Violet 19, C.I. Pigment Blue 15:3, and C.I. Pigment Blue 15:4.

3. The aqueous ink-jet composition as claimed in claim 1, wherein said alkali metal ion represented by $M^2$ and $M^4$ is $Na^+$ or $Li^+$, said quaternary ammonium ion represented by $M^2$ and $M^4$ is a cation represented by formula (IV):

(IV)

wherein $R^5$ to $R^8$ are each hydrogen, an alkyl group having 1 to 4 carbon atoms, or a halogenated alkyl group having 1 to 4 carbon atoms; said quaternary phosphonium ion represented by $M^2$ and $M^4$ is a cation represented by formula (V):

(V)

wherein $R^9$ to $R^{12}$ are each hydrogen, an alkyl group having 1 to 4 carbon atoms, an hydroxyalkyl group having 1 to 4 carbon atoms, or a halogenated alkyl group having 1 to 4 carbon atoms; and said alkanolamine ion represented by $M^2$ and $M^4$ is a cation represented by formula (VI):

(VI)

wherein at least one of $R^{13}$ to $R^{16}$ is a hydroxyalkyl group having 1 to 4 carbon atoms, and the other is hydrogen, an alkyl group having from 1 to 4 carbon atoms or a halogenated alkyl group having 1 to 4 carbon atoms.

4. The aqueous ink-jet composition as claimed in claim 1, wherein said penetrating agent comprises at least one surfactant selected from the group consisting of:

a compound represented by formula (I), $$R^1O(CH_2CH_2O)_pCH_2COOM^1 \qquad (I)$$

a compound represented by formula (II), $$R^2O(CH_2CH_2O)_qSO_3M^2 \qquad (II)$$

a compound represented by formula (III), $$R^3O(CH_2CH_2O)_rPO(OM^3)OM^4 \qquad (III)$$

wherein $R^1$ is a straight-chain or branched alkyl group having from 6 to 14 carbon atoms; $R^2$ and $R^3$ are each an alkyl group having 4 to 24 carbon atoms, an alkylphenyl group or an alkylallyl group; $M^1$, $M^2$, end $M^4$ are each an alkali metal ion, a quaternary ammonium ion, a quaternary phosphonium ion or an alkanolamine ion; $M^3$ is hydrogen or $R(CH_2CH_2O)_r$ in which R is an alkyl group having from 1 to 4 carbon atoms, an alkylphenyl group or an alkylallyl group; p is an integer of 3 to 12; q is an integer of 4 to 50 and r is en integer of 4 to 20; and a compound represented by formula (VII),

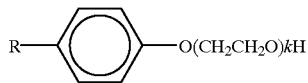

(VII)

wherein R is a straight-chain or branched carbon chain having from 6 to 14 carbon atoms; and k is an integer of 5 to 12.

5. The aqueous ink-jet composition as claimed in claim 4, further comprising at least one compound selected from the group consisting of urea and urea compounds.

6. The aqueous ink-jet composition as claimed in claim 1, wherein said wetting agent comprises at least one pyrrolidone compound.

7. The aqueous ink-jet composition as claimed in claim 1, which has a pH of 9 or more and less than 11.

8. A set of color ink compositions for ink-jet recording, comprising:

a yellow ink composition which comprises a coloring agent comprising at least one pigment selected from the group consisting of C.I. Pigment Yellow 128, C.I. Pigment Yellow 138, C.I Pigment Yellow 151, C.I. Pigment Yellow 97, and C.I. Pigment Yellow 150, an anionic surfactant of formula (II) or (III):

$$R^2O(CH_2CH_2O)_qSO_3M^2 \qquad (II)$$

$$R^3O(CH_2CH_2O)_rPO(OM^3)OM^4 \qquad (III)$$

wherein $R^2$ and $R^3$ are each an alkyl group having 4 to 24 carbon atoms, an alkylphenyl group or an alkylallyl group; $M^2$ and $M^4$ are each an alkali metal ion, a quaternary ammonium ion, a quaternary phosphonium ion or an alkanolamine ion; $M^3$ is hydrogen or $R(CH_2CH_2O)_r$ in which R is an alkyl group having from 1 to 4 carbon atoms, an alkylphenyl group or an alkylallyl group; q is an integer of 4 to 50 and r is an integer of 4 to 20 and a water-soluble organic solvent, a wetting agent, a penetrating agent and water;

a magenta ink composition which comprises a coloring agent comprising at least one pigment selected from the group consisting of C.I. Pigment Red 122 and C.I. Pigment Violet 19, an anionic surfactant of formula (II) or (III):

$$R^2O(CH_2CH_2O)_qSO_3M^2 \qquad (II)$$

$$R^3O(CH_2CH_2O)_rPO(OM^3)OM^4 \qquad (III)$$

wherein $R^2$ and $R^3$ are each an alkyl group having 4 to 24 carbon atoms, an alkylphenyl group or an alkylallyl group; $M^2$ and $M^4$ are each an alkali metal ion, a quaternary ammonium ion, a quaternary phosphonium ion or an alkanolamine ion; $M^3$ is hydrogen or $R(CH_2CH_2O)_r$ in which R is an alkyl group having from 1 to 4 carbon atoms, an alkylphenyl group or an alkylallyl group; q is an integer of 4 to 50 and r is an integer of 4 to 20, and a water-soluble organic solvent;

a cyan ink composition which comprises a coloring agent comprising at least one pigment selected from the group consisting of C.I. Pigment Blue 15:3 and C.I. Pigment Blue 15:4, an anionic surfactant of formula (II) or (III):

$$R^2O(CH_2CH_2O)_qSO_3M^2 \qquad (II)$$

$$R^3O(CH_2CH_2O)_rPO(OM^3)OM^4 \qquad (III)$$

wherein $R^2$ and $R^3$ are each an alkyl group having 4 to 24 carbon atoms, an alkylphenyl group or an alkylallyl group; $M^2$ and $M^4$ are each an alkali metal ion, a quaternary ammonium ion, a quaternary phosphonium ion or an alkanolamine ion; $M^3$ is hydrogen or $R(CH_2CH_2O)_t$ in which R is an alkyl group having from 1 to 4 carbon atoms, an alkylphenyl group or an alkylallyl group; q is an integer of 4 to 50 and r is an integer of 4 to 20, and a water-soluble organic solvent; and a black ink composition which comprises C.I. Pigment Black 7, a wetting agent a penetrating agent and water wherein said ink composition has a surface tension of 20 mN/m or more and less than 35 mN/in.

9. The aqueous ink-jet composition as claimed in claim 1, wherein the pigment component is present in the composition in an amount of 0.1 to 15 wt % based on the weight of the composition.

10. The aqueous ink-jet composition as claimed in claim 1, wherein the pigment component has an average particle diameter ranging from 0,01 to 0.2 μm.

11. The aqueous ink-jet composition as claimed in claim 5 wherein said urea or urea compound is present in the composition in an amount of 0.1 to 10 wt % based on the weight of the composition.

12. The aqueous ink-jet composition as claimed in claim 1, wherein the wetting agent is a polyhydric alcohol, an alkyl ether of a polyhydric alcohol, an aryl ether of a polyhydric alcohol, a nitrogen-containing hetero cyclic compound, an amide, a sulfur-containing compound, propylenecarbonate or ethylene carbonate.

13. The aqueous ink-jet composition as claimed in claim 1, wherein the amount of said penetrating agent ranges from 0.5 to 5wt % based on the weight of the composition.

14. The aqueous ink-jet composition as claimed in claim 13, wherein the amount of said penetrating agent ranges from 0.5 to 2wt % based on the weight of the composition.

15. The aqueous ink-jet composition as claimed in claim 1, wherein the composition further comprises at least one additive selected from the group consisting of an antiseptic agent, a mildew-proofing agent, a pH adjustor, a chelating agent and a corrosion inhibitor.

* * * * *